United States Patent
Park et al.

(10) Patent No.: US 10,281,737 B2
(45) Date of Patent: May 7, 2019

(54) LENS MOVING APPARATUS, CAMERA MODULE AND OPTICAL APPLIANCE INCLUDING THE SAME

(71) Applicant: LG Innotek Co., Ltd., Seoul (KR)

(72) Inventors: Sang Ok Park, Seoul (KR); Sang Jun Min, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 16/161,811

(22) Filed: Oct. 16, 2018

(65) Prior Publication Data

US 2019/0086685 A1 Mar. 21, 2019

Related U.S. Application Data

(63) Continuation of application No. 15/984,827, filed on May 21, 2018, now Pat. No. 10,133,087, which is a
(Continued)

(30) Foreign Application Priority Data

Mar. 18, 2015 (KR) .................. 10-2015-0037251

(51) Int. Cl.
*G02B 7/02* (2006.01)
*G02B 7/04* (2006.01)
(Continued)

(52) U.S. Cl.
CPC ............ *G02B 27/646* (2013.01); *G02B 7/02* (2013.01); *G02B 7/04* (2013.01); *G03B 3/10* (2013.01);
(Continued)

(58) Field of Classification Search
CPC .......... G02B 27/646; G02B 7/09; G02B 7/04; G02B 7/023; G02B 7/026; G02B 7/102;
(Continued)

(56) References Cited

U.S. PATENT DOCUMENTS 7,697,216 B2 4/2010 Wada et al.
7,936,523 B2 5/2011 Higuchi
(Continued)

FOREIGN PATENT DOCUMENTS

JP 2013-120248 A 6/2013

OTHER PUBLICATIONS

European Search Report dated Jul. 26, 2016 in European Application No. EP16159597.
(Continued)

*Primary Examiner* — Michael S Osinski
(74) *Attorney, Agent, or Firm* — Saliwanchik, Lloyd & Eisenschenk

(57) ABSTRACT

Embodiments provide a lens moving apparatus including a bobbin in which a lens is mounted, a first coil and a magnet configured to electromagnetically interact with each other so as to move the bobbin, a housing configured to accommodate the bobbin therein, an elastic member including an inner frame coupled to the bobbin, an outer frame coupled to the housing, and a frame connection portion configured to connect the inner frame and the outer frame to each other, and a support member connected to the elastic member and configured to support the housing, and the outer frame includes a first coupling portion coupled to the housing, a second coupling portion coupled to the support member, the second coupling portion being spaced apart from the first coupling portion, and a single connection portion configured to connect the first coupling portion and the second coupling portion to each other.

21 Claims, 18 Drawing Sheets

Related U.S. Application Data continuation of application No. 15/646,566, filed on Jul. 11, 2017, now Pat. No. 10,001,658, which is a continuation of application No. 15/424,235, filed on Feb. 3, 2017, now Pat. No. 9,740,020, which is a continuation of application No. 15/074,348, filed on Mar. 18, 2016, now Pat. No. 9,599,838.

(51) Int. Cl.

| | | |
|---|---|---|
| *G03B 3/10* | (2006.01) | |
| *G03B 5/00* | (2006.01) | |
| *H04M 1/02* | (2006.01) | |
| *G02B 27/64* | (2006.01) | |
| *H02K 33/18* | (2006.01) | |
| *H04N 5/225* | (2006.01) | |

(52) U.S. Cl.
CPC .............. *G03B 5/00* (2013.01); *H02K 33/18* (2013.01); *H04M 1/0264* (2013.01); *H04N 5/2257* (2013.01); *G03B 2205/0007* (2013.01); *G03B 2205/0069* (2013.01)

(58) Field of Classification Search
CPC .......... G02B 7/005; G02B 7/02; G02B 7/022; G03B 3/10; G03B 5/00; G03B 5/02; G03B 5/04; G03B 5/06; G03B 13/36; G03B 2205/0069; G03B 2205/0007; G03B 2205/0053; G03B 2205/0046; H04N 5/2254; H04N 5/2257; H04N 5/2253; H04N 5/23287; H04N 5/23212
See application file for complete search history.

(56) References Cited

U.S. PATENT DOCUMENTS

| | | | |
|---|---|---|---|
| 8,638,510 B2 | 1/2014 | Lee et al. | |
| 8,676,048 B2 | 3/2014 | Jung et al. | |
| 9,001,224 B2 | 4/2015 | Moriya et al. | |
| 9,134,503 B2 | 9/2015 | Topliss | |
| 9,304,326 B2 | 4/2016 | Dong | |
| 9,341,860 B2 | 5/2016 | Wu et al. | |
| 9,380,193 B2 | 6/2016 | Park et al. | |
| 9,455,617 B2* | 9/2016 | Park .................. | G02B 7/102 |
| 9,568,743 B2* | 2/2017 | Hayashi ............... | G02B 27/646 |
| 9,740,020 B2 | 8/2017 | Park et al. | |
| 9,857,555 B2* | 1/2018 | Lee .................... | G02B 7/09 |
| 9,977,255 B2* | 5/2018 | Park .................... | G02B 7/09 |
| 10,082,638 B2* | 9/2018 | Park .................... | G02B 7/08 |
| 2010/0060999 A1 | 3/2010 | Higuchi | |
| 2011/0090580 A1 | 4/2011 | Shiraki et al. | |
| 2011/0096178 A1 | 4/2011 | Ryu et al. | |
| 2011/0169348 A1 | 7/2011 | Park | |
| 2012/0082442 A1 | 4/2012 | Kwon et al. | |
| 2012/0120512 A1* | 5/2012 | Wade .................. | G02B 7/026 359/824 |
| 2012/0154614 A1 | 6/2012 | Moriya et al. | |
| 2012/0229926 A1 | 9/2012 | Wade et al. | |
| 2012/0307088 A1 | 12/2012 | Han | |
| 2012/0314308 A1 | 12/2012 | Ikushima et al. | |
| 2013/0119785 A1* | 5/2013 | Han .................... | H02K 41/035 310/12.16 |
| 2013/0258475 A1 | 10/2013 | Lee | |
| 2013/0314792 A1* | 11/2013 | Hu .................... | G02B 7/08 359/557 |
| 2014/0072289 A1 | 3/2014 | Lim et al. | |
| 2014/0327965 A1 | 11/2014 | Chen et al. | |
| 2014/0327978 A1* | 11/2014 | Min ................... | H02K 41/0356 359/824 |
| 2014/0362284 A1 | 12/2014 | Shin et al. | |
| 2015/0022891 A1 | 1/2015 | Hu et al. | |
| 2015/0062421 A1 | 3/2015 | Kwon et al. | |
| 2015/0062706 A1 | 3/2015 | Lim et al. | |
| 2015/0103195 A1 | 4/2015 | Kwon et al. | |
| 2015/0198816 A1 | 7/2015 | Dong | |
| 2015/0323758 A1 | 11/2015 | Lee et al. | |
| 2016/0025995 A1 | 1/2016 | Ariji | |
| 2016/0048033 A1 | 2/2016 | Kim et al. | |
| 2016/0109719 A1 | 4/2016 | Cho et al. | |
| 2016/0139425 A1 | 5/2016 | Park et al. | |
| 2016/0142636 A1 | 5/2016 | Kim | |
| 2016/0161757 A1 | 6/2016 | Hee et al. | |
| 2016/0178923 A1* | 6/2016 | Hayashi .................. | G02B 7/04 359/557 |
| 2016/0178925 A1 | 6/2016 | Park et al. | |
| 2016/0187671 A1 | 6/2016 | Park et al. | |
| 2016/0205304 A1 | 7/2016 | Oh | |
| 2016/0209672 A1 | 7/2016 | Park et al. | |
| 2016/0216529 A1 | 7/2016 | Park et al. | |
| 2016/0241787 A1 | 8/2016 | Sekimoto | |
| 2016/0246030 A1 | 8/2016 | Park et al. | |
| 2016/0277684 A1 | 9/2016 | Park et al. | |
| 2016/0291285 A1 | 10/2016 | Park et al. | |
| 2016/0291344 A1 | 10/2016 | Terajima | |
| 2017/0082827 A1 | 3/2017 | Park et al. | |
| 2017/0146773 A1* | 5/2017 | Park .................... | H02K 33/18 |
| 2018/0011284 A1* | 1/2018 | Park .................... | H02K 11/215 |
| 2018/0188474 A1* | 7/2018 | Enta .................... | H04N 5/2253 |

OTHER PUBLICATIONS

Notice of Allowance dated Nov. 3, 2016 in U.S. Appl. No. 15/074,348.

\* cited by examiner

LENS MOVING APPARATUS, CAMERA MODULE AND OPTICAL APPLIANCE INCLUDING THE SAME

CROSS-REFERENCE TO RELATED APPLICATIONS

This application is a continuation of U.S. application Ser. No. 15/984,827, filed May 21, 2018; which is a continuation of U.S. application Ser. No. 15/646,566, filed Jul. 11, 2017, now U.S. Pat. No. 10,001,658, issued Jun. 19, 2018; which is a continuation of U.S. application Ser. No. 15/424,235, filed Feb. 3, 2017, now U.S. Pat. No. 9,740,020, issued Aug. 22, 2017; which is a continuation of U.S. application Ser. No. 15/074,348, filed Mar. 18, 2016, now U.S. Pat. No. 9,599,838, issued Mar. 21, 2017; which claims priority under 35 U.S.C. § 119 to Korean Patent Application No. 10-2015-0037251, filed Mar. 18, 2015, each of which is hereby incorporated by reference in its entirety.

TECHNICAL FIELD

Embodiments relate to a lens moving apparatus, a camera module and optical appliance including the same.

BACKGROUND

Technology of a voice coil motor (VCM), which is used in existing general camera modules, is difficult to apply to a camera module for micro-scale and low power consumption, and study related thereto has been actively conducted.

In the case of a camera module configured to be mounted in a small electronic product, such as a smart phone, the camera module may frequently receive shock when in use, and may undergo fine shaking due to, for example, user hand tremor. In consideration of this fact, there is a demand for development related to technology of additionally installing a device for inhibiting hand tremor to a camera module.

BRIEF SUMMARY

Embodiments provide a lens moving apparatus, a camera module, and an optical appliance, which may distribute stress which is applied to an upper elastic member thereof due to shock and may improve accuracy for hand tremor compensation, and a camera module including the same.

In one embodiment, a lens moving apparatus includes a bobbin in which a lens is mounted, a first coil and a magnet configured to electromagnetically interact with each other so as to move the bobbin, a housing configured to accommodate the bobbin therein, an elastic member including an inner frame coupled to the bobbin, an outer frame coupled to the housing, and a frame connection portion configured to connect the inner frame and the outer frame to each other, and a support member connected to the elastic member and configured to support the housing, wherein the outer frame includes a first coupling portion coupled to the housing, a second coupling portion coupled to the support member, the second coupling portion being spaced apart from the first coupling portion, and a single connection portion configured to connect the first coupling portion and the second coupling portion to each other.

The first coupling portion may include a plurality of coupling regions coupled of the housing, and the connection portion may be connected to any one coupling region among the coupling regions.

The second coupling portion may be spaced apart from the remaining coupling region excluding the coupling region connected to the connection portion.

The connection portion may have a smaller width than a width of the frame connection portion.

The outer frame may have a left-right symmetrical shape about a reference line, and the reference line may be a straight line passing through a center of the bobbin and a corner of the housing.

The coupling regions may be left-right symmetrical about the reference line.

A first coupling region among the coupling regions may be closer to the reference line than a second coupling region, the first coupling region among the coupling regions may be connected to the connection portion, and the second coupling region among the coupling regions may be spaced apart from the connection portion.

The connection portion may include a first portion extending from the first coupling portion in a direction parallel to the reference line, and a second portion bent from an end of the first portion, the second portion being connected to the second coupling portion.

A distance from the reference line to the second coupling portion may be greater than a maximum distance from the reference line to the first portion of the connection portion.

The support member may be spaced apart from the housing.

The housing may include a plurality of upper support bosses, the first coupling portion may include a plurality of through-holes coupled to the upper support bosses, and the through-holes coupled to the upper support bosses may form a plurality of coupling regions.

The connection portion may be spaced apart from the housing.

The lens moving apparatus may further include a second coil disposed so as to be opposite to the magnet, and a circuit board disposed under the second coil, and the support member may include one end electrically connected to the second coupling portion and the other end electrically connected to the circuit board.

The first coupling portion may include first to fourth coupling regions, the second coupling portion may include a second-first coupling portion and a second-second coupling portion spaced apart from each other, and the connection portion may include a first connection portion configured to connect the first coupling region and the second-first coupling portion to each other, and a second connection portion configured to connect the third coupling region and the second-second coupling portion to each other.

The support member may include a first support member connected to the second-first coupling portion, and a second support member connected to the second-second coupling portion.

The first and second coupling regions may be located at a left side of a reference line, the third and fourth coupling regions may be located at a right side of the reference line, a distance between each of the first and third coupling regions and the reference line may be smaller than a distance between each of the second and fourth coupling regions and the reference line, and the reference line may be a straight line passing through a center of the bobbin and a corner of the housing.

In another embodiment, a lens moving apparatus includes a bobbin in which a lens is mounted, a first coil and a magnet configured to electromagnetically interact with each other so as to move the bobbin, a housing configured to accommodate the bobbin therein, a plurality of first upper elastic members coupled to the bobbin and the housing, and support members connected to the first upper elastic members and configured to support the housing, wherein each of the first upper elastic members includes an inner frame coupled to the bobbin, an outer frame coupled to the housing, and a frame connection portion configured to connect the inner frame and the outer frame to each other, and wherein the outer frame includes a first coupling portion having a plurality of first coupling regions coupled to the housing, a second coupling portion coupled to any one of the support members, the second coupling portion being spaced apart from the first coupling portion, and a single first connection portion configured to connect the first coupling portion and the second coupling portion to each other, the first connection portion extending from any one of the coupling regions.

A first distance between a first coupling region among the first coupling regions, connected to the first connection portion, and a reference line may be smaller than a second distance between each of the remaining first coupling regions, excluding the first coupling region connected to the first connection portion, and the reference line.

In one embodiment, a camera module includes a lens barrel, the lens moving apparatus, the lens moving apparatus being configured to move the lens barrel, and an image sensor configured to convert an image, introduced through the lens moving apparatus, into an electrical signal.

In one embodiment, an optical appliance includes a display module including a plurality of pixels, color of which varies by an electrical signal, the camera module according to claim 21, the camera module being configured to convert an image, introduced through a lens, into an electrical signal, and a controller configured to control operation of the display module and the camera module.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
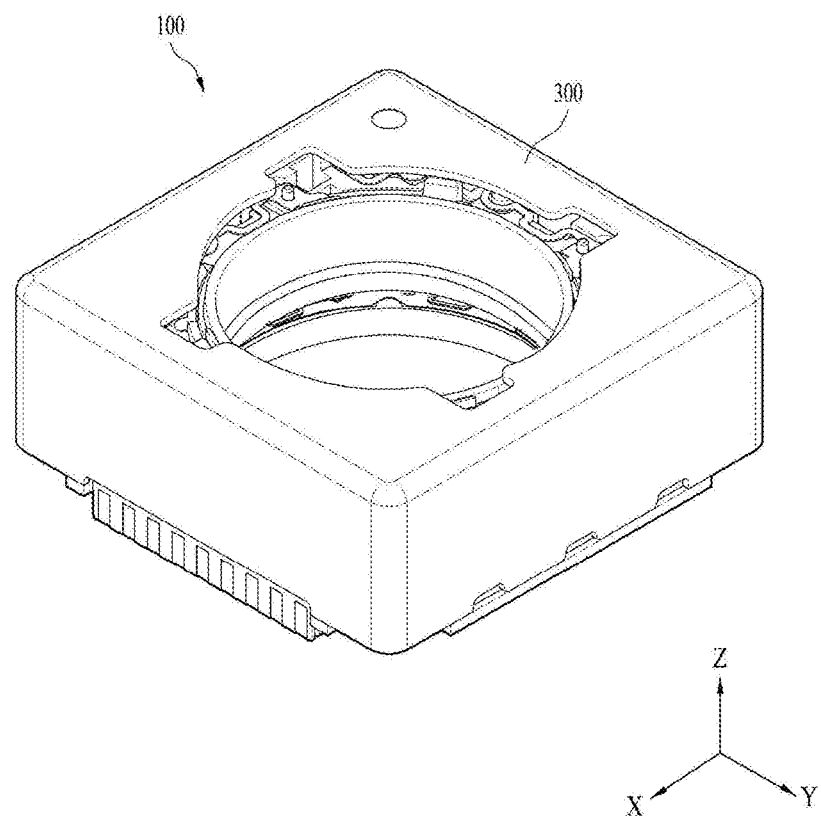
FIG. 1 is a schematic perspective view illustrating a lens moving apparatus according to an embodiment.

Hereinafter, embodiments will be clearly revealed via description thereof with reference to the accompanying drawings. In the following description of the embodiments, it will be understood that, when an element such as a layer (film), region, pattern, or structure is referred to as being "on" or "under" another element, it can be "directly" on or under another element or can be "indirectly" formed such that an intervening element may also be present. In addition, it will also be understood that criteria of on or under is on the basis of the drawing.

In the drawings, dimensions of layers are exaggerated, omitted or schematically illustrated for clarity and description convenience. In addition, dimensions of constituent elements do not entirely reflect actual dimensions. Wherever possible, the same reference numbers will be used throughout the drawings to refer to the same or like parts. Hereinafter, a lighting apparatus according to embodiments will be described with reference to the accompanying drawings.

Hereinafter, a lens moving apparatus according to an embodiment will be described with reference to the accompanying drawings. For the convenience of description, although the lens moving apparatus will be described using a rectangular coordinate system (x, y, z), the lens moving apparatus may be described using other coordinate systems, and the embodiment is not limited thereto. In the respective drawings, the X-axis and the Y-axis mean directions perpendicular to an optical axis, i.e. the Z-axis, and the optical axis (Z-axis) direction may be referred to as a "first direction", the X-axis direction may be referred to as a "second direction", and the Y-axis direction may be referred to as a "third direction".

A "hand tremor compensation device", which is applied to a subminiature camera module of a mobile device such as, for example, a smart phone or a tablet PC, may be a device that is configured to inhibit the contour line of a captured image from not being clearly formed due to vibration caused by the user's hand tremor when capturing a still image.

In addition, an "auto-focusing device" is a device that automatically focuses an image of a subject on an image sensor surface. The hand tremor compensation device and the auto-focusing device may be configured in various ways, and the lens moving apparatus according to the embodiment may move an optical module, which is constituted of at least one lens, in the first direction, or relative to a plane defined by the second and third directions, thereby performing hand tremor compensation motion and/or auto-focusing.

Figure 2:
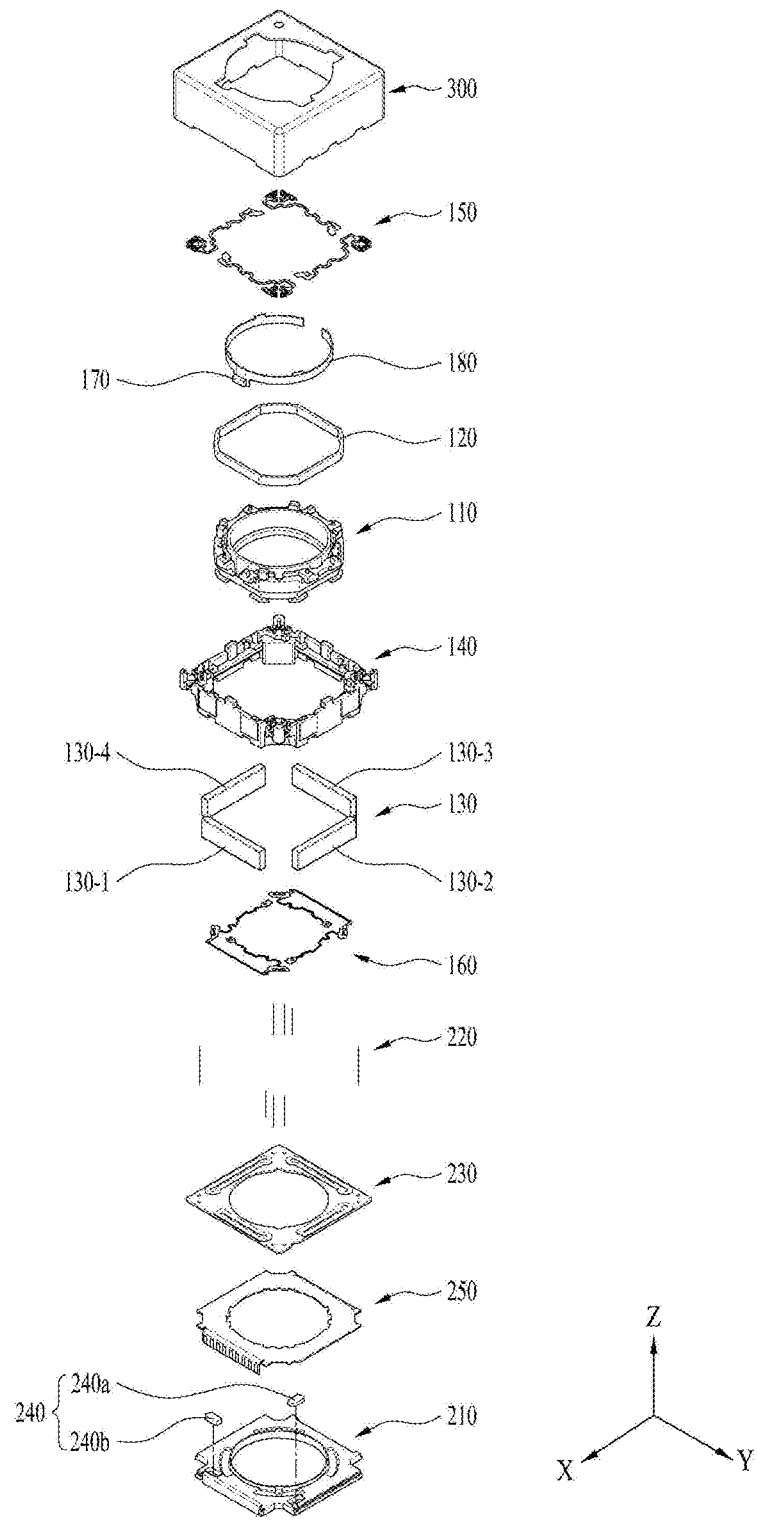
FIG. 2 is an exploded perspective view of the lens moving apparatus illustrated in FIG. 1.

FIG. 1 is a schematic perspective view illustrating the lens moving apparatus 100 according to an embodiment, and FIG. 2 is an exploded perspective view of the lens moving apparatus 100 illustrated in FIG. 1.

Referring to FIGS. 1 and 2, the lens moving apparatus 100 may include a cover member 300, an upper elastic member 150, a sensor board 180, a first position sensor 170, a first coil 120, a bobbin 110, a housing 140, a magnet 130, a lower elastic member 160, a plurality of support members 220, a second coil 230, a circuit board 250, a second position sensor 240, and a base 210.

First, the cover member 300 will be described.

The cover member 300 defines an accommodation space along with the base 210, such that the upper elastic member 150, the bobbin 110, the first coil 120, the housing 140, the magnet 130, the lower elastic member 160, the support members 220, the second coil 230, and the circuit board 250 are accommodated in the accommodation space.

The cover member 300 may take the form of a box, which has an open bottom and includes an upper end portion and sidewalls. The bottom of the cover member 300 may be coupled to the top of the base 210. The upper end portion of the cover member 300 may have a polygonal shape such as, for example, a square or octagonal shape.

The cover member 300 may have a bore formed in the upper end portion thereof in order to expose a lens (not illustrated) coupled to the bobbin 110 to outside light. In addition, the bore of the cover member 300 may be provided with a window formed of a light-transmitting material, in order to inhibit impurities, such as, for example, dust or moisture, from entering a camera module.

Although the material of the cover member 300 may be a non-magnetic material such as, for example, SUS in order to inhibit the cover member 300 from being attracted by the magnet 130, the cover member 300 may be formed of a magnetic material and may function as a yoke.

Figure 3:
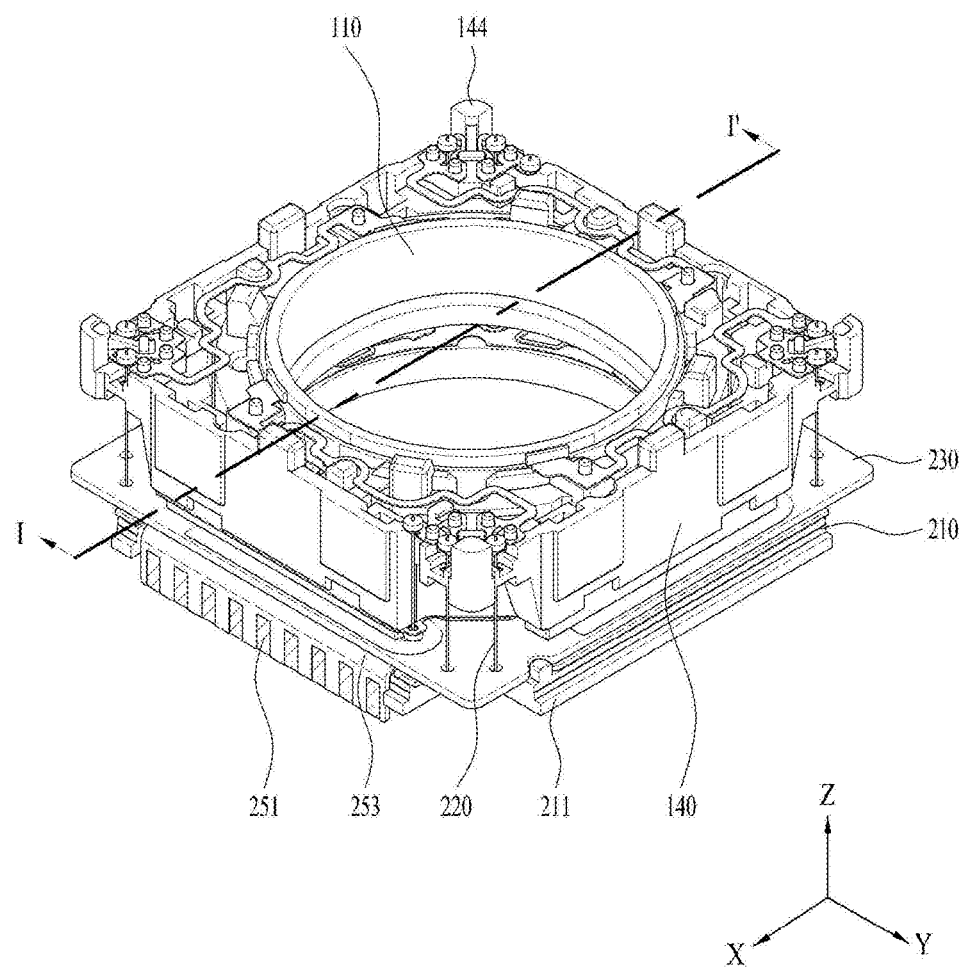
FIG. 3 is an assembled perspective view illustrating the lens moving apparatus after removal of a cover member of FIG. 1.
Figure 4:
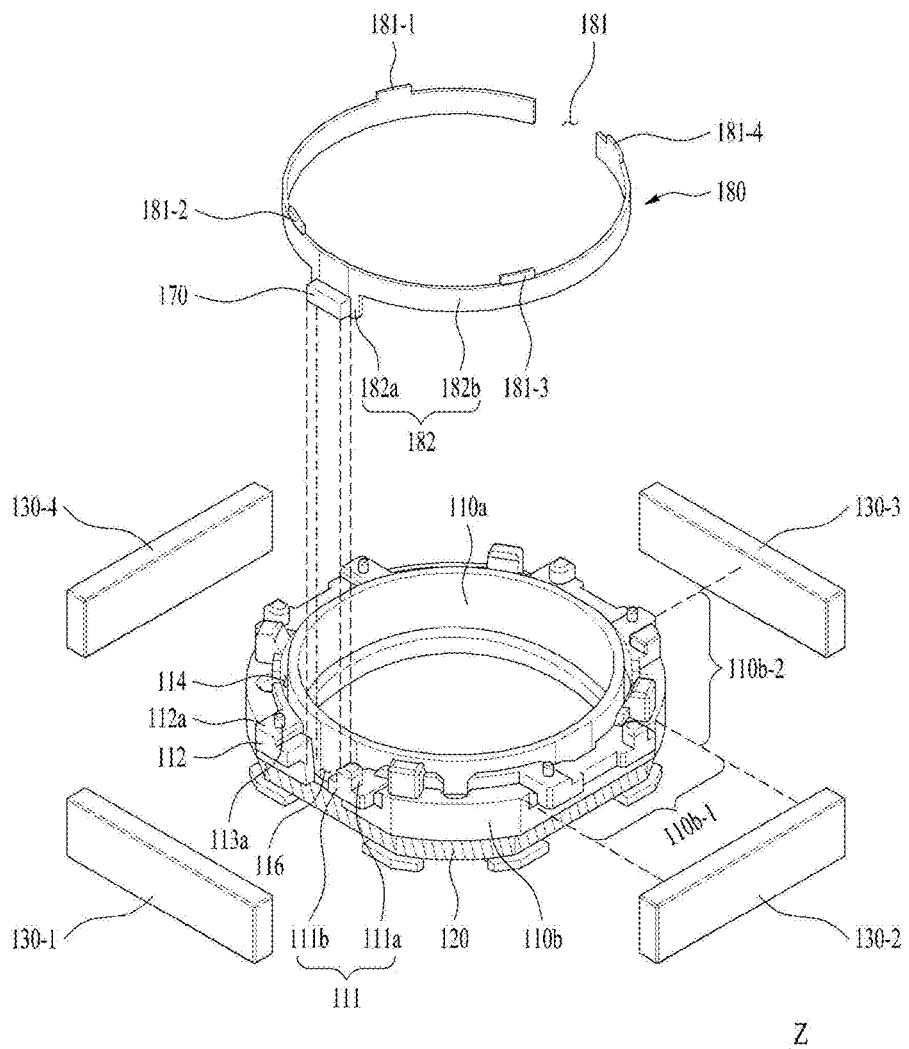
FIG. 4 is an exploded perspective view of a bobbin, first coil, magnet, first position sensor, and sensor board illustrated in FIG. 2.

FIG. 3 is an assembled perspective view illustrating the lens moving apparatus 100 after removal of the cover member 300 of FIG. 1, and FIG. 4 is an exploded perspective view of the bobbin 110, the first coil 120, the magnet 130, the first position sensor 170, and the sensor board 180 illustrated in FIG. 2.

Next, the bobbin 110 will be described.

Referring to FIGS. 3 and 4, the bobbin 110 is placed inside the housing 140, which will be described below, and is movable in the first direction, for example, in the Z-axis via electromagnetic interaction between the first coil 120 and the magnet 130.

Although not illustrated, the bobbin 110 may include a lens barrel (not illustrated) in which at least one lens is installed. The lens barrel may be coupled inside the bobbin 110 in various manners.

For example, the bobbin 110 may be configured to have a bore for the mounting of the lens or the lens barrel. The bore may have a circular, elliptical, or polygonal shape, without being limited thereto.

The bobbin 110 may include first and second protrusions 111 and 112.

The first protrusion 111 of the bobbin 110 may include a guide portion 111a and a first stopper 111b.

The guide portion 111a of the bobbin 110 may serve to guide an installation position of the upper elastic member 150. For example, as exemplarily illustrated in FIG. 3, the guide portion 111a of the bobbin 110 may guide a first frame connection portion 153 of the upper elastic member 150.

The second protrusion 112 of the bobbin 110 may be formed on an outer circumferential surface 110b of the bobbin 110 so as to protrude in the second and third directions, which are perpendicular to the first direction. In addition, the second protrusion 112 of the bobbin 110 may be provided on an upper surface 112a thereof with a first coupling boss 113a, which is coupled to a first inner frame 151 of the upper elastic member 150, which will be described below.

The first stopper 111b of the first protrusion 111 and the second protrusion 112 of the bobbin 110 may serve to inhibit the bottom surface of the body of the bobbin 110 from directly colliding with the base 210 and the upper surface of the circuit board 250 even if the bobbin 110 moves beyond a prescribed range due to, for example, external shock when being moved in the optical axis direction or in the first direction, which is parallel to the optical axis, for auto-focusing.

To this end, the first stopper 111b of the bobbin 110 may far protrude in the second or third direction, which is the circumferential direction, from the outer circumferential surface 110b of the bobbin 110 than the guide portion 111a of the bobbin 110. In addition, the second protrusion 112 of the bobbin 110 may far protrude laterally than the upper surface 112a on which the upper elastic member 150 is seated.

The bobbin 110 may have a support groove 114 provided between an inner circumferential surface 110a and the outer circumferential surface 110b of the bobbin 110 so as to allow the sensor board 180 to be inserted into the bobbin 110 in the first direction. For example, the support groove 114 of the bobbin 110 may be provided between the inner circumferential surface 110a of the bobbin 110 and the first and second protrusions 111 and 112 so as to enable the insertion of the sensor board 180.

The bobbin 110 may have a receiving recess 116, which is suitable to receive the first position sensor 170 disposed, coupled, or mounted on the sensor board 180.

For example, the receiving recess 116 of the bobbin 110 may be provided in the space between the first and second protrusions 111 and 112 of the bobbin 110, so as to allow the first position sensor 170 mounted on the sensor board 180 to be inserted in the first direction.

The bobbin 110 may have a second coupling boss 117 (see FIG. 9) formed on the lower surface thereof so as to be coupled and fixed to the lower elastic member 160.

When the position at which the lower surfaces of the first and second protrusions 111 and 112 of the bobbin 110 come into contact with a bottom surface 146a of a first seating groove 146 of the housing 140 is set to an initial position, auto-focusing may be controlled so as to be performed in a single direction. That is, auto-focusing may be implemented such that the bobbin 110 moves upward when current is supplied to the first coil 120, and moves downward when the supply of current is interrupted.

However, when the position at which the lower surfaces of the first and second protrusions 111 and 112 of the bobbin 110 are spaced apart from the bottom surface 146a of the first seating groove 146 by a given distance is set to an initial position, auto-focusing may be controlled so as to be performed in two directions. For example, auto-focusing may be implemented such that the bobbin 110 moves upward when forward current is applied to the first coil 120 and moves downward when reverse current is applied to the first coil 120.

Next, the first coil 120 will be described.

The first coil 120 is disposed on the outer circumferential surface 110*b* of the bobbin 110.

The first coil 120 may be located so as not to overlap the first position sensor 170 in the direction perpendicular to the optical axis, for example, in the X-axis or the Y-axis.

For example, in order to ensure that the first coil 120 and the first position sensor 170 do not interfere or overlap each other in the direction perpendicular to the optical axis, the first position sensor 170 may be located on the upper portion of the outer circumferential surface 110*b* of the bobbin 110, and the first coil 120 may be located on the lower portion of the outer circumferential surface 110*b* of the bobbin 110.

The first coil 120, as exemplarily illustrated in FIG. 4, may be wound so as to surround the outer circumferential surface 110*b* of the bobbin 110 in the direction in which the first coil 120 rotates about the optical axis. For example, the first coil 120 may be inserted into and coupled to a coil groove formed in the outer circumferential surface 110*b* of the bobbin 110, without being limited thereto.

As exemplarily illustrated in FIG. 4, the first coil 120 may be directly wound around the outer circumferential surface 110*b* of the bobbin 110. In another embodiment, the first coil 120 may take the form of an angled ring-shaped coil block, without being limited thereto.

The first coil 120 may produce electromagnetic force via interaction with the magnet 130 when current is supplied thereto, thereby moving the bobbin 110 in the first direction using the electromagnetic force. The first coil 120 may be disposed so as to correspond to or face the magnet 130.

Next, the first position sensor 170 and the sensor board 180 will be described.

The first position sensor 170 may be disposed, coupled, or mounted on the bobbin 110, so as to move along with the bobbin 110. The first position sensor 170 may move along with the bobbin 110 when the bobbin 110 moves in the first direction.

The first position sensor 170 may sense the strength of a magnetic field of the magnet 130 depending on the movement of the bobbin 110, and may output a signal based on the sensed result.

The first position sensor 170 may be electrically connected to the sensor board 180. The first position sensor 170 may take the form of a driver including a Hall sensor, or may take the form of a position detection sensor alone such as, for example, a Hall sensor.

The first position sensor 170 may be disposed, coupled, or mounted on the bobbin 110 in various forms, and may receive current in various ways depending on the form in which the first position sensor 170 is disposed, coupled, or mounted.

The first position sensor 170 may be disposed, coupled, or mounted on the outer circumferential surface 110*b* of the bobbin 110. For example, the first position sensor 170 may be disposed, coupled, or mounted on the sensor board 180, and the sensor board 180 may be coupled to the bobbin 110.

The first position sensor 170 may be electrically connected to at least one of the upper elastic member 150 and the lower elastic member 160. For example, the first position sensor 170 may be electrically connected to the upper elastic member 150.

The sensor board 180 may be mounted on the bobbin 110, and may move along with the bobbin 110 in the optical axis direction or in the direction parallel to the optical axis. For example, the sensor board 180 may be inserted into the support groove 114 of the bobbin 110 and coupled to the bobbin 110. The sensor board 180 is sufficient so long as it is mounted on the bobbin 110, and FIG. 4 illustrates the sensor board 180 having a ring shape, without being limited thereto.

The first position sensor 170 may be attached to and supported by the front surface of the sensor board 180 using an adhesive member such as, for example, a double-sided tape, or epoxy.

The outer circumferential surface 110*b* of the bobbin 110 may be comprised of first side surfaces 110*b*-1 and second side surfaces 110*b*-2. The first side surfaces 110*b*-1 correspond to first side portions 141 of the housing 140 on which the magnet 130 is disposed. The second side surfaces 110*b*-2 are located between the first side surfaces 110*b*-1 so as to connect the first side surfaces 110*b*-1 to one another.

The first position sensor 170 may be disposed on any one of the first side surfaces 110*b*-1 of the bobbin 110. For example, the receiving recess 116 of the bobbin 110 may be provided at any one of the first side surfaces 110*b*-1 of the bobbin 110, and the first position sensor 170 may be located in the receiving recess 116 of the bobbin 110.

The first position sensor 170 may be disposed, coupled, or mounted on an upper portion A1, a middle portion A2, or a lower portion A3 of the outer circumferential surface of the sensor board 180 in various forms. At this time, the first position sensor 170 may receive current from the outside through a circuit of the sensor board 180.

The sensor board 180 may include a body 182, elastic member contact portions 184-1 to 184-4, and a circuit pattern.

The body 182 of the sensor board 180 may include a first segment 182*a* on which the first position sensor 170 is disposed, coupled, or mounted, and a second segment 182*b* connected to the first segment 182*b* and configured so as to be inserted into the support groove 114 of the bobbin 110. The elastic member contact portions 184-1 to 184-4 may be provided on the second segment 182*b*.

For example, in order to allow the sensor board 180 to be easily inserted into the support groove 114 of the bobbin 110, the second segment 182*b* of the sensor board 180 may be provided with an opening 181.

The elastic member contact portions 184-1 to 184-4 of the sensor board 180 may be connected to the first inner frame 151 of the upper elastic member 150.

The circuit pattern of the sensor board 180 may be formed on the body 182 of the sensor board 180, and may electrically connect the first position sensor 170 and the elastic member contact portions 184-1 to 184-4 to each other.

For example, in order to increase the distance between the first position sensor 170 and the first coil 120, the first position sensor 170 may be disposed, coupled, or mounted on the upper portion of the outer circumferential surface of the sensor board 180. This serves to inhibit the malfunction and errors of the first position sensor 170 by inhibiting the first position sensor 170 from being affected by the magnetic field of the first coil 120 within a high frequency range.

At least a portion of the first position sensor 170 may overlap the magnet 130 in the direction perpendicular to the optical axis, without being limited thereto.

A lens moving apparatus in accordance with another embodiment may further include a separate sensing magnet for the first position sensor 170. The separate sensing magnet may be mounted on the bobbin 110 or the housing 140. At this time, at least a portion of the first position sensor 170 may overlap the sensing magnet in the direction perpendicular to the optical axis, rather than overlapping the magnet 130.

Next, the housing 140 will be described.

The housing 140 may support the magnet 130, and may accommodate the bobbin 110 therein so as to allow the bobbin 110 to move in the first direction, which is parallel to the optical axis.

The housing 140 may generally have a hollow column shape. For example, the housing 140 may have a polygonal (e.g., a square or octagonal) or circular bore.

Figure 5:
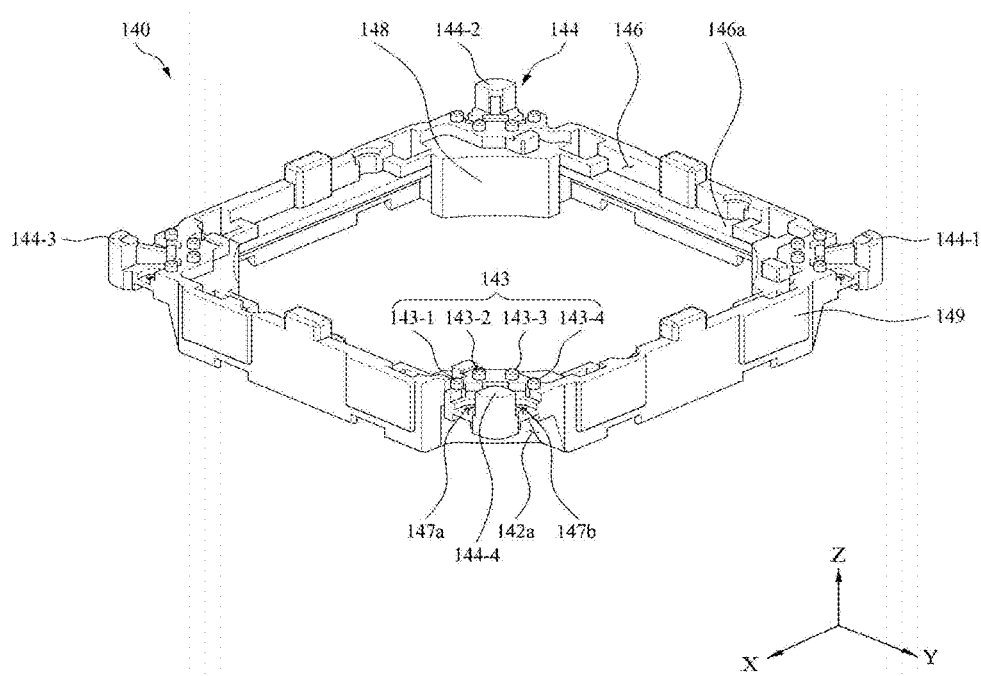
FIG. 5 is a perspective view of a housing illustrated in FIG. 2.
Figure 6:
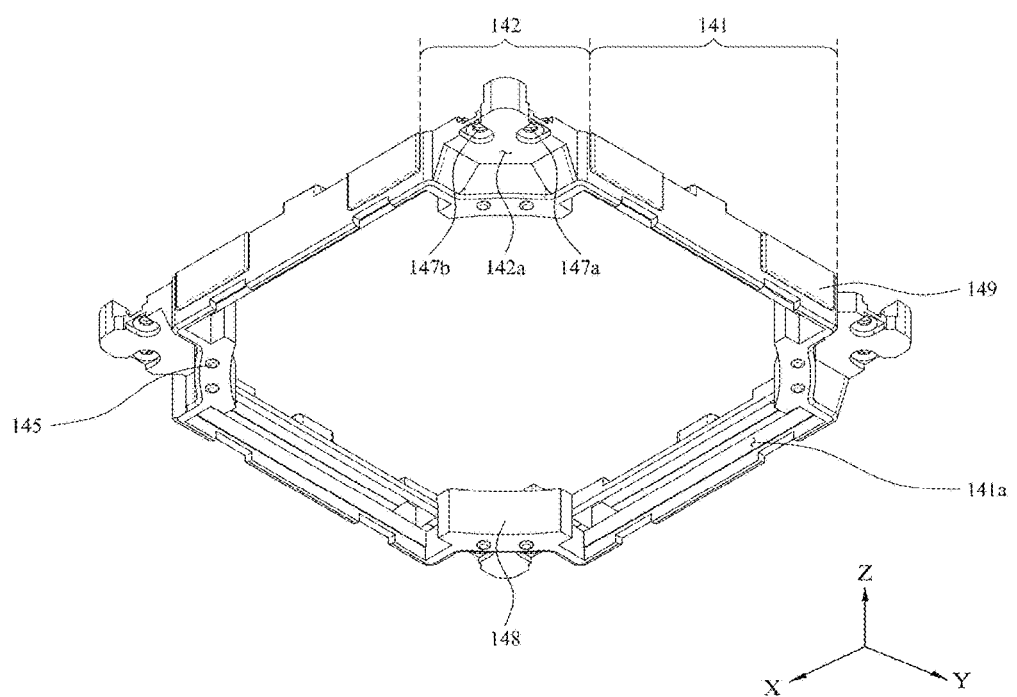
FIG. 6 is a bottom perspective view of the housing illustrated in FIG. 2.
Figure 7:
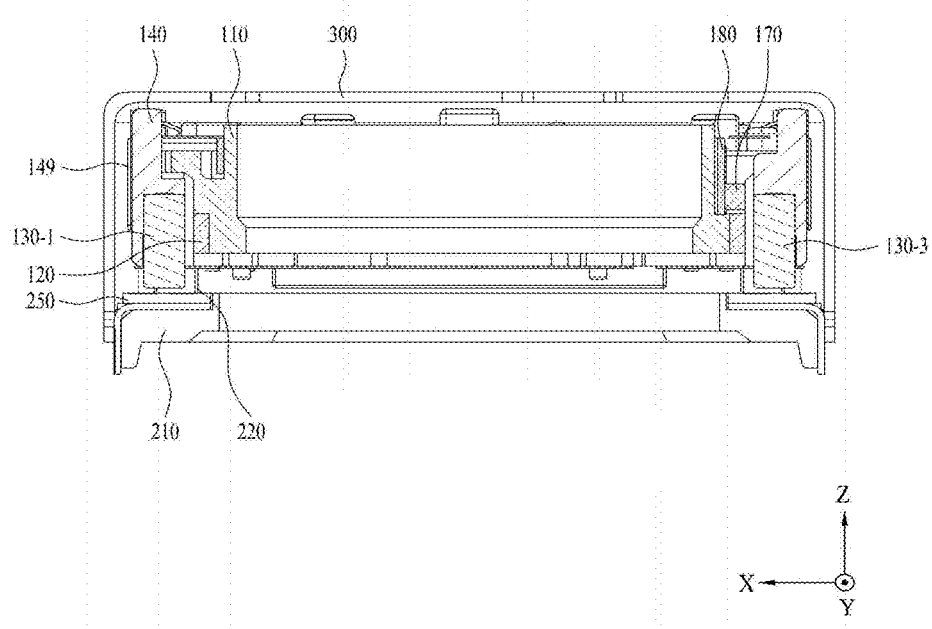
FIG. 7 is a sectional view taken along line I-I' illustrated in FIG. 3.
Figure 8:
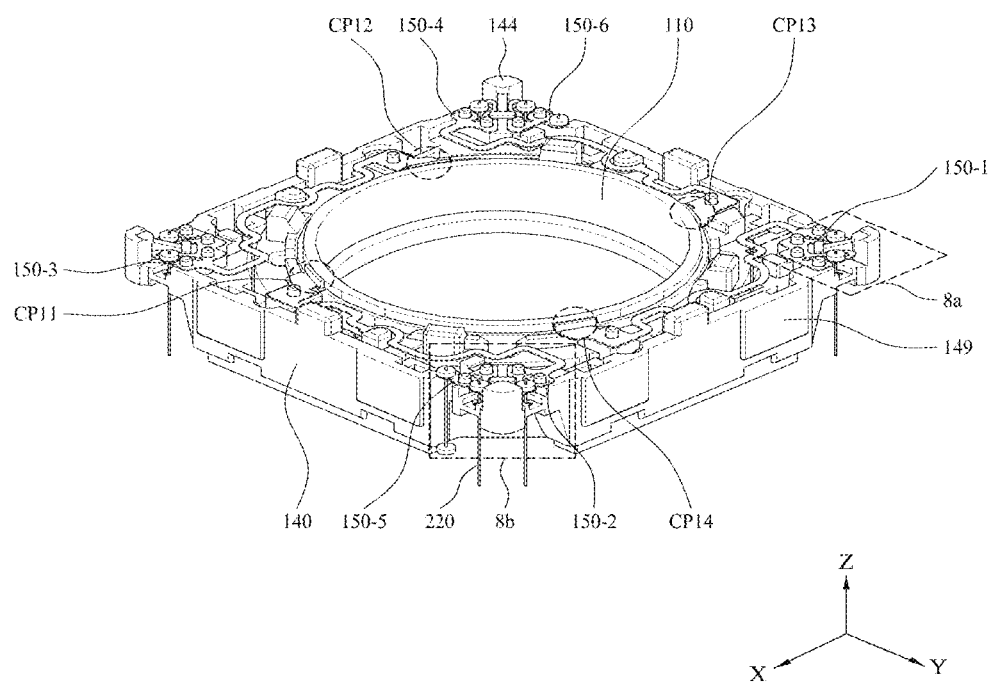
FIG. 8 is a perspective view illustrating the coupled state of the bobbin, housing, upper elastic member, first position sensor, sensor board, and a plurality of support members illustrated in FIG. 2.
Figure 9:
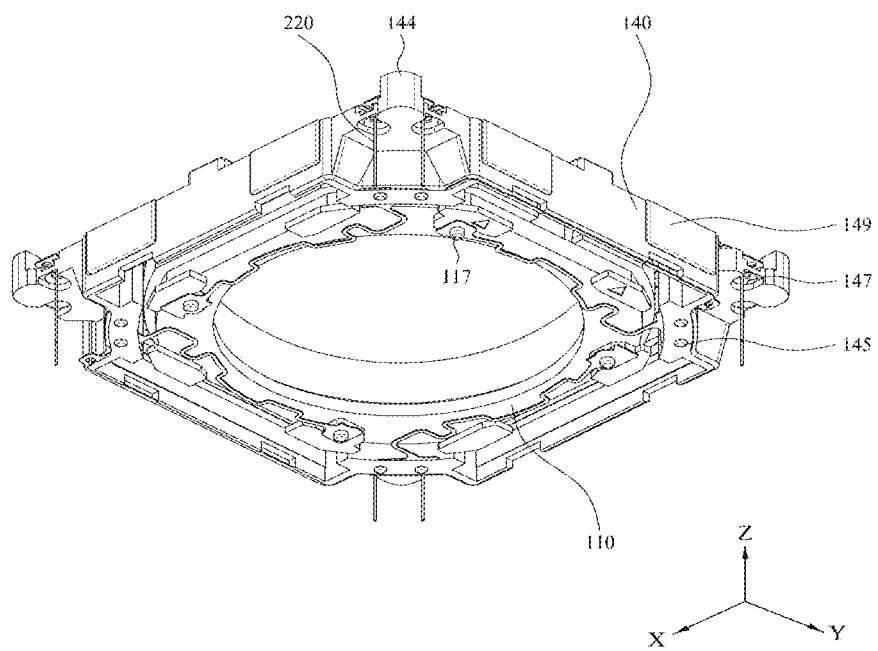
FIG. 9 is a bottom perspective view illustrating the coupled state of the bobbin, housing, lower elastic member, and a plurality of support members illustrated in FIG. 2.

FIG. 5 is a perspective view of the housing 140 illustrated in FIG. 2, FIG. 6 is a bottom perspective view of the housing 140 illustrated in FIG. 2, FIG. 7 is a sectional view taken along line I-I' of FIG. 3, FIG. 8 is a perspective view illustrating the coupled state of the bobbin 110, the housing 140, the upper elastic member 150, the first position sensor 170, the sensor board 180, and the support members 220 illustrated in FIG. 2, and FIG. 9 is a bottom perspective view illustrating the coupled state of the bobbin 110, the housing 140, the lower elastic member 160, and the support members 220 illustrated in FIG. 2.

The housing 140 may have the first seating groove 146 formed at a position thereof corresponding to the first and second protrusions 111 and 112 of the bobbin 110.

The housing 140 may have a third protrusion 148, which corresponds to each of the second side surfaces 110b-2 of the bobbin 110. The third protrusion 148 of the housing 140 may inhibit the bobbin 110 from being rotated even if the bobbin 110 receives force in the direction in which the bobbin 110 is rotated about the optical axis, rather than being rotated in the optical axis direction.

For example, the upper edge of the outer periphery of the housing 140 may have a square plan shape, whereas the lower edge of the inner periphery may have an octagonal plan shape, as exemplarily illustrated in FIGS. 5 and 6. The housing 140 may include a plurality of side portions. For example, the housing 140 may include four first side portions 141 and four second side portions 142.

The magnet 130 may be mounted on the first side portions 141 of the housing 140. The second side portions 142 of the housing 140 may be located respectively between the two neighboring first side portions 141. The support members 220 may be disposed on the second side portions 142 of the housing 140. The first side portions 141 of the housing 140 may interconnect the second side portions 142 of the housing 140.

The housing 140 may have magnet seats 141a provided on inner surfaces of the first side portions 141 in order to accommodate magnets 130-1 to 130-4. Each of the magnets 130-1 to 130-4 may be fixed to the magnet seat 141a, which is provided on a corresponding one of the first side portions 141 of the housing 140.

The magnet seat 141a of the housing 140 may be configured as a groove having a size corresponding to the size of the magnet 130. An aperture may be formed in the bottom surface of the magnet seat 141a of the housing 140. The lower surface of the magnet 130 fixed to the magnet seat 141a may face the second coil 230.

The magnet 130 may be secured to the magnet seat 141a of the housing 140 using an adhesive, without being limited thereto, and for example, an adhesive member such as a double-sided tape may be used.

Alternatively, the magnet seat 141a of the housing 140 may be configured as a mounting hole, which allows a portion of the magnet 130 to be fitted thereinto or to be exposed therefrom, rather than being configured as the groove illustrated in FIG. 6.

The first side portion 141 of the housing 140 may be oriented parallel to the side surface of the cover member 300. In addition, the first side portion 141 of the housing 140 may be larger than the second side portion 142. The second side portion 142 of the housing 140 may be provided with first through-holes 147a and 147b, through which the support members 220 pass.

In addition, in order to inhibit the housing 140 from directly colliding with the inner side surface of the cover member 300 illustrated in FIG. 1, the housing 140 may be provided at the upper end thereof with a second stopper 144.

The housing 140 may have at least one first upper support boss 143 formed on the upper surface thereof for the coupling of the upper elastic member 150.

For example, the first upper support boss 143 of the housing 140 may be formed on the upper surface of the housing 140 corresponding to the second side portion 142 of the housing 140. The first upper support boss 143 of the housing 140 may have a semispherical shape, cylindrical shape or prism shape, without being limited thereto.

The housing 140 may have second a lower support boss 145 formed on the lower surface thereof for the coupling and fixing of the lower elastic member 160.

In order to define paths for the passage of the support members 220 and to ensure the space to be filled with silicon, which serves as a damper, the housing 140 may have a first recess 142a formed in the second side portion 142.

The housing 140 may have a plurality of third stoppers 149 protruding from the side surface thereof. The third stoppers 149 serve to inhibit the housing 140 from colliding with the cover member 300 when the housing 140 moves in the second and third directions.

In order to inhibit the lower surface of the housing 140 from colliding with the base 210 and/or the circuit board 250 which will be described below, the housing 140 may further have a fourth stopper (not illustrated) protruding from the lower surface thereof. Through this configuration, the housing 140 may be downwardly spaced apart from the base 210 and may be upwardly spaced apart from the cover member 300. In this way, the housing 140 may perform hand tremor compensation in the direction perpendicular to the optical axis.

The magnet 130 may be accommodated inside the first side portion 141 of the housing 140, without being limited thereto. In another embodiment, the magnet 130 may be disposed outside the first side portion 141 of the housing 140, or may be disposed inside or outside the second side portion 142 of the housing 140.

Next, the magnet 130 will be described.

Each of the magnets 130-1 to 130-4 may be configured as a single body, and may be a unipolar magnet, the inner side and the outer side of which have different polarities.

For example, the magnets 130-1 to 130-4 may be disposed such that the boundary between an S-pole and an N-pole of each magnet is parallel to the direction perpendicular to the direction in which the magnet 130 and the first coil 120 face each other.

For example, although each of the magnets 130-1 to 130-4 may be oriented such that the surface thereof facing the first coil 120 is the S-pole 132 and the opposite surface is the N-pole 134, the embodiment is not limited thereto, and the opposite configuration is also possible.

At least two or more magnets 130 may be installed, and in the embodiment, four magnets 130 may be installed. The shape of the magnet 130 may correspond to the shape of the first side portion 141 of the housing 140, without being limited thereto. For example, the magnet 130 may have a rectangular shape, without being limited thereto, and the magnet 130 may have a triangular or diamond shape based on the position thereof on the housing 140.

Although the surface of the magnet 130 facing the first coil 120 may be flat, the embodiment is not limited thereto. The surface of the magnet 130 facing the first coil 120 may be curved.

One pair of magnets 130-2 and 130-4 among the magnets 130-1 to 130-4 may be arranged parallel to each other in the second direction (in the X-axis), and the other pair of magnets 130-1 and 130-3 may be arranged parallel to each other in the third direction (in the Y-axis).

In another embodiment, the magnet 130 may be a bipolar magnet. At this time, the kinds of bipolar magnets may be broadly divided into ferrite, alnico, and rare-earth magnets, for example, and may be sorted into a P-type and an F-type according to the form of a magnetic circuit. The embodiment is not limited as to the kinds of bipolar magnets.

Next, the upper elastic member 150, the lower elastic member 160, and the support members 220 will be described.

The upper elastic member 150 and the lower elastic member 160 elastically support the bobbin 110. The support members 220 may support the housing 140 so as to be movable relative to the base 210 in the direction perpendicular to the optical axis, and may electrically connect at least one of the upper and lower elastic members 150 and 160 to the circuit board 250.

Figure 11:
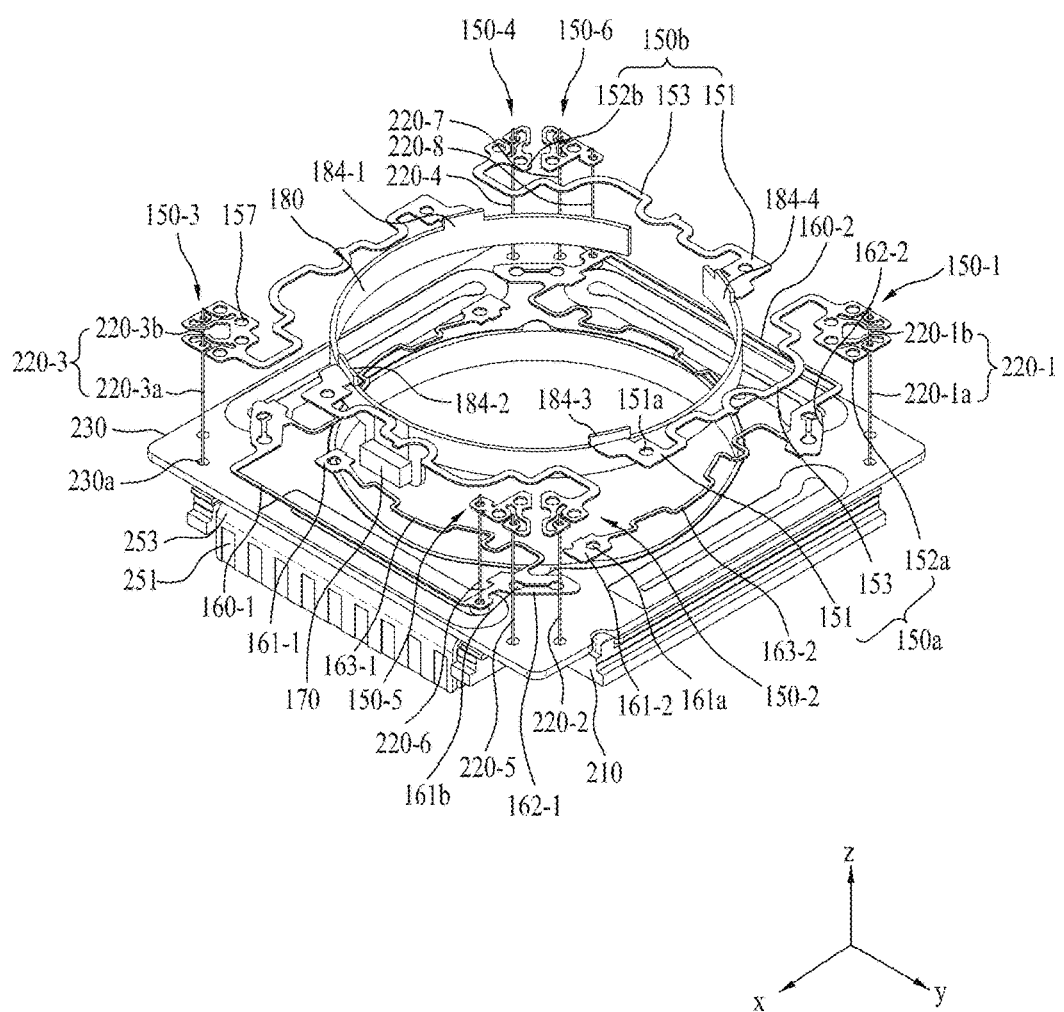
FIG. 11 is an assembled perspective view illustrating the upper elastic member, lower elastic member, first position sensor, sensor board, base, support members, and circuit board illustrated in FIG. 2.

FIG. 11 is an assembled perspective view illustrating the upper elastic member 150, the lower elastic member 160, the first position sensor 170, the sensor board 180, the base 210, the support members 220, and the circuit board 250 illustrated in FIG. 2.

The upper elastic member 150 may include a plurality of upper elastic members 150-1 to 150-4 (and 150-5 and 150-6), which are electrically separated from one another.

For example, the separate upper elastic members 150-1 to 150-4 (and 150-5 and 150-6) may be point symmetrical to one another in the X-Y plane on the basis of the center of the bobbin 110. Here, "point symmetry" refers to symmetry in which two forms overlap each other when the two forms are rotated by 180 degrees about a single rotation center point.

The elastic member contact portions 184-1 to 184-4 of the sensor board 180 may be electrically connected to at least one of the upper elastic member 150 and the lower elastic member 160.

FIG. 11 illustrates that the elastic member contact portions 184-1 to 184-4 of the sensor board 180 come into electrical contact with the upper elastic members 150-1 to 150-4, without being limited thereto. In another embodiment, the elastic member contact portions 184-1 to 184-4 of the sensor board 180 may come into electrical contact with the lower elastic member 160, or may come into electrical contact with both the upper elastic member 150 and the lower elastic member 160.

The respective elastic member contact portions 184-1 to 184-4 of the sensor board 180, which are electrically connected to the first position sensor 170, may be electrically connected to a corresponding one of the upper elastic members 150-1 to 150-4. In addition, the respective upper elastic members 150-1 to 150-4 may be electrically connected to a corresponding one of the support members 220-1 to 220-4.

Each one 150a of the first and third upper elastic members 150-1 and 150-3 may include a first inner frame 151, a first-first outer frame 152a, and a first frame connection portion 153.

Each one 150b of the second and fourth upper elastic members 150-2 and 150-4 may include the first inner frame 151, a first-second outer frame 152b, and the first frame connection portion 153.

The first inner frame 151 of each of the upper elastic members 150-1 to 150-4 may be coupled or fixed to the bobbin 110. For example, the first coupling boss 113a of the bobbin 110 may be inserted into a second-first through-hole 151a formed in the first inner frame 151 of each of the upper elastic members 150-1 to 150-4, and then both the first coupling boss 113a and the second-first through-hole 151a may be fixed to each other via thermal bonding, or using an adhesive such as, for example, epoxy. The first inner frame 151 of each of the upper elastic members 150-1 to 150-4 may be electrically connected to a corresponding one of the elastic member contact portions 184-1 to 184-4 of the sensor board 180.

The first-first and first-second outer frames 152a and 152b of the upper elastic members 150-1 to 150-4 may be coupled to the housing 140 and may be connected to the support members 220.

The first frame connection portion 153 of each of the upper elastic members 150-1 to 150-4 may connect the first inner frame 151 to the first-first outer frame 152a or the first-second outer frame 152b. Although the first-second outer frame 152b may be formed by bisecting the first-first outer frame 152a, the embodiment is not limited thereto. In another embodiment, the first-first outer frame 152a may be bisected, and each part of the bisected first-first outer frame 152a may have the same shape as or may be symmetrical to the first-second outer frame 152b.

The first frame connection portion 153 of each of the upper elastic members 150-1 to 150-4 may be bent at least one time so as to form a given pattern. Upward and/or downward movement of the bobbin 110 in the first direction may be elastically supported via position variation and fine deformation of the first frame connection portion 153 of each of the upper elastic members 150-1 to 150-4.

The first-first or first-second outer frame 152a or 152b of the upper elastic member 150 illustrated in FIG. 11 may be coupled and fixed to the first upper support boss 143 of the housing 140.

In the embodiment, each of the first-first and first-second outer frames 152a and 152b may be formed with a second-second through-hole 157, which has a shape and position corresponding to those of the first upper support boss 143. At this time, the first upper support boss 143 and the second-second through-hole 157 may be fixed to each other via thermal bonding, or using an adhesive such as, for example, epoxy.

After the first inner frames 151 are coupled to the bobbin 110 and the first-first and first-second outer frames 152a and 152b are coupled to the housing 140, conductive connections CP11, CP12, CP13 and CP14 are performed on the elastic member contact portions 184-1 to 184-4 of the sensor board 180 and the first inner frames 151 using such as, for example, solders or conductive epoxy, as illustrated in FIG. 8.

Through the conductive connections CP11, CP12, CP13 and CP14, (+) power and (−) power may be applied to the first position sensor 170, and the first position sensor 170 may output a positive (+) output signal or negative (−) output signal. In addition, in order to enable the first position sensor 170 to receive (+) power and (−) power from the circuit board 250 and to output a positive (+) output signal or negative (−) output signal to the circuit board 250, the upper elastic member 150 may be divided into the first to fourth upper elastic members 150-1 to 150-4.

The respective first to fourth upper elastic members 150-1 to 150-4 may be connected to the circuit board 250 via the support members 220-1 to 220-4. That is, each of the first to fourth upper elastic members 150-1 to 150-4 may be electrically connected to the circuit board 250 via at least one of the support members 220-1 to 220-4.

For example, the first upper elastic member 150-1 may be electrically connected to the circuit board 250 via at least one of first-first and first-second support members 220-1a and 220-1b.

The second upper elastic member 150-2 may be electrically connected to the circuit board 250 via a second support member 220-2. The third upper elastic member 150-3 may be electrically connected to the circuit board 250 via at least one of third-first and third-second support members 220-3a and 220-3b. The fourth upper elastic member 150-4 may be electrically connected to the circuit board 250 via a fourth support member 220-4. In this way, the first position sensor 170 may receive power supplied from the circuit board 250 through the support members 220-1 to 220-4 and the first to fourth upper elastic members 150-1 to 150-4, or may output signals to the circuit board 250.

The support members 220-1 to 220-4 may be connected to the circuit board 250 through holes 230a (see FIG. 10) formed in a circuit member 231, which will be described below. In another embodiment, no holes may be formed in the circuit member 231 and the circuit board 250, and the support members 220 may be electrically connected to the circuit member 231 via, for example, soldering.

Meanwhile, the lower elastic member 160 may include first and second lower elastic members 160-1 and 160-2, which are electrically separated from each other.

The first coil 120 may be connected to the support members 220 through the first and second lower elastic members 160-1 and 160-2.

Each of the first and second lower elastic members 160-1 and 160-2 may include at least one second inner frame 161-1 or 161-2, at least one second outer frame 162-1 or 162-2, and at least one second frame connection portion 163-1 or 163-2.

The second inner frames 161-1 and 161-2 of the first and second lower elastic members 160-1 and 160-2 may be coupled to the bobbin 110, and the second outer frames 162-1 and 162-2 may be coupled to the housing 140.

The second-first frame connection portion 163-1 of the first lower elastic member 160-1 may connect the second inner frame 161-1 and the second outer frame 162-1 to each other, and the second-second frame connection portion 163-2 of the second lower elastic member 160-2 may connect the second inner frame 161-2 and the second outer frame 162-2 to each other.

Both ends of the first coil 120 may be electrically connected to the first and second lower elastic members 160-1 and 160-2. For example, one end of the first coil 120 may be electrically connected to the second inner frame 161-1 of the first lower elastic member 160-1, and the other end of the first coil 120 may be electrically connected to the second inner frame 161-2 of the second lower elastic member 160-2. The first and second lower elastic members 160-1 and 160-2 may receive power of different polarities and may transmit the power to the first coil 120. In order to transmit the power of different polarities to the first coil 120 as described above, the lower elastic member 160 may be bisected into the first and second lower elastic members 160-1 and 160-2.

At least of the second-first and second-second frame connection portions 163-1 and 163-2 may be bent at least one time so as to form a given pattern.

In addition, the upper elastic member 160 may further include fifth and sixth upper elastic members 150-5 and 150-6, which are electrically separated from the first to fourth elastic members 150-1 to 150-4. The fifth and sixth upper elastic members 150-5 and 150-6 may be spaced apart from each other and may be electrically separated from each other.

Each of the fifth and sixth upper elastic members 150-5 and 150-6 may be coupled to the housing 140, and may be electrically connected to support members 220-5 to 220-8.

The fifth and sixth upper elastic members 150-5 and 150-6 may be coupled to only the housing 140 without being coupled to the bobbin 110, and may elastically support the housing 140. That is, the fifth and sixth upper elastic members 150-5 and 150-6 may be spaced apart from the bobbin 110 and may not come into contact with the bobbin 110.

Some support members 220-6 and 220-8 among the support members 220-5 to 220-8, which are coupled to the fifth and sixth upper elastic members 150-5 and 150-6, may be connected to the second outer frames 162-1 and 162-2 of the lower elastic members 160-1 and 160-2, and the remaining support members 220-5 and 220-7 among the support members 220-5 to 220-8 may be electrically connected to the circuit board 250 through the holes 230a formed in the circuit member 231.

For example, the fifth upper elastic member 150-5 may be connected to the fifth and sixth support members 220-5 and 220-6, and the sixth upper elastic member 150-6 may be connected to the seventh and eighth support members 220-7 and 220-8.

Each of the fifth and sixth upper elastic members 150-5 and 150-6 may have through-holes for the coupling of the support members 220-5 to 220-8, and a through-hole for the coupling of the first upper support boss 143.

The first lower elastic member 160-1 may be electrically connected to the circuit board 250 via the sixth support member 220-6, the fifth upper elastic member 150-5, and the fifth support member 220-5. The second lower elastic member 160-2 may be electrically connected to the circuit board 250 via the eighth support member 220-8, the sixth upper elastic member 150-6, and the seventh support member 220-7.

Figure 12:
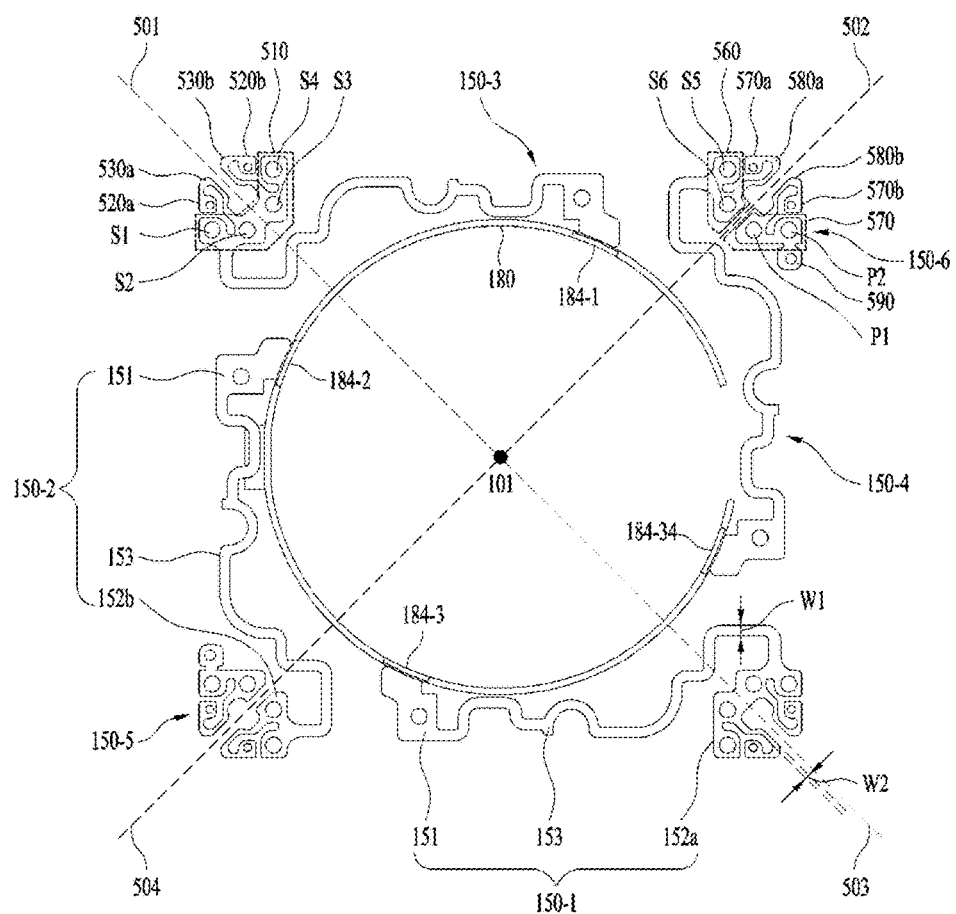
FIG. 12 is a plan view of the upper elastic member illustrated in FIG. 2.

FIG. 12 is a plan view of the upper elastic member 150 illustrated in FIG. 2.

Referring to FIG. 12, the upper elastic member 150 may include the first to sixth upper elastic members 150-1 to 150-6, which are spaced apart from one another.

The outer frames 152a and 152b of the upper elastic members 150 include first coupling portions 510, 560 and 570, which are coupled to the housing 140, second coupling portions 520a, 520b, 570a and 570b, which are coupled to the support members 220-1 to 220-5 and 220-7, and connection portions 530a, 530b, 580a and 580b, which connect the first coupling portions 510, 560 and 570 and the second coupling portions 520a, 520b, 570a and 570b to each other.

Figure 14A:
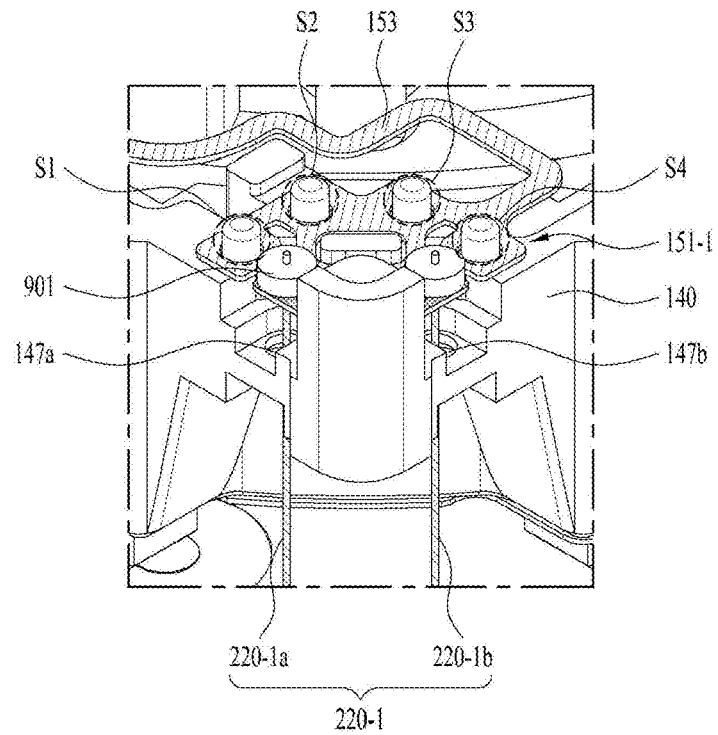
FIG. 14A is a first enlarged perspective view of a first portion illustrated by a dotted line in FIG. 8.

The support members 220-1 to 220-5 and 220-7 may be electrically connected to the second coupling portions 520a, 520b, 570a and 570b using, for example, solders or conductive adhesive (e.g. conductive epoxy) 901 (see FIG. 14A). For example, one end of the respective support members 220-1 to 220-5 and 220-7 may penetrate the second coupling portions 520a, 520b, 570a and 570b, and the solders 901 may electrically bond one end of the respective support members 220-1 to 220-5 and 220-7 and the second coupling portions 520a, 520b, 570a and 570b to each other.

For example, the outer frame 152a of each of the first and third upper elastic members 150-1 and 150-3 may include the first coupling portion 510, which is coupled to the first upper support bosses 143-1 to 143-4 (see FIG. 5) of the housing 140, the second coupling portions 520a and 520b, which are coupled to the support member 220-1 or 220-3, and the connection portions 530a and 530b, which connect the first coupling portion 510 and the second coupling portions 520a and 520b to each other.

For example, the outer frame 152b of each of the second and fourth upper elastic members 150-2 and 150-4 may include the first coupling portion 560, which is coupled to the first upper support bosses 143 of the housing 140, the second coupling portion 570a, which is coupled to the support member 220-2 or 220-4, and the connection portion 580a, which connects the first coupling portion 560 and the second coupling portion 570a to each other.

For example, each of the fifth and sixth upper elastic members 150-5 and 150-6 may include the first coupling portion 570, which is coupled to the first upper support bosses 143 of the housing 140, the second coupling portion 570b, which is coupled to the support member 220-5 or 220-7, the connection portion 580b, which connects the first coupling portion 570 and the second coupling portion 570b to each other, and a third coupling portion 590, which is connected to the first coupling portion 570 and is coupled to the support member 220-6 or 220-8.

The support members 220-5 and 220-7 may be electrically connected to the second coupling portions 570b using, for example, solders or conductive adhesive (e.g. conductive epoxy).

Each of the first coupling portions 510, 560 and 570 of the outer frames 152a and 152b of the upper elastic members 150 may include two or more coupling regions S1 to S4, S5 and S6, or P1 and P2, which are coupled to the housing 140. Although the coupling regions S1 to S4, S5 and S6, or P1 and P2 are configured as the through-holes 157, the embodiment is not limited thereto. In another embodiment, the coupling regions S1 to S4, S5 and S6, or P1 and P2 may have any of various forms suitable for the coupling of the housing 140, and for example, may be recesses.

For example, although the first coupling portion 510 of the outer frame 152a of each of the first and third upper elastic members 150-1 and 150-3 may include four coupling regions S1 to S4 (see FIG. 14A), the first coupling portion 560 of the outer frame 152b of each of the second and fourth upper elastic members 150-2 and 150-4 may include two coupling regions S5 and S6 (see FIG. 15A), and the first coupling portion 570 of each of the fifth and sixth upper elastic members 150-5 and 150-6 may include two coupling regions P1 and P2 (see FIG. 15A), the embodiment is not limited as to the number of the coupling regions.

The second coupling portions 520a, 520b, 570a and 570b of the respective upper elastic members 150-1 to 150-6 may be connected to any one of the coupling regions S1 to S6 and P1 and P2 of the first coupling portions 510, 560 and 570 via the connection portions 530a, 530b, 580a and 580b, and may be spaced apart from the remaining coupling regions excluding the aforementioned coupling region.

For example, one end of each of the connection portions 530a, 530b, 580a and 580b of the upper elastic members 150-1 to 150-6 may connect any one of the coupling regions S1 to S6 and P1 and P2 of the first coupling portions 510, 560 and 570 and the second coupling portion 520a, 520b, 570a or 570b to each other.

The connection portion 530a, 530b, 580a or 580b of the upper elastic member 150 may be bent at least one time, and a width W2 of the connection portion 530a, 530b, 580a or 580b may be smaller than a width W1 of the first frame connection portion 153 of the upper elastic member 150.

Because of the width W2 that is smaller than the width W1, the connection portion 530a, 530b, 580a or 580b may easily move in the first direction, and consequently, may distribute stress applied to the upper elastic members 150 and stress applied to the support members 220.

Although the width W1 of the first frame connection portion 153 of the upper elastic member 150 is greater than the width of the second frame connection portion 163-1 or 163-2 of the lower elastic member 160, the embodiment is not limited thereto.

In another embodiment, the width of the connection portion 530a, 530b, 580a or 580b of the upper elastic member 150 may be smaller than the width of the second frame connection portion 163-1 or 163-2 of the lower elastic member 160. In this case, the width of the connection portion 530a, 530b, 580a or 580b of the upper elastic members 150 may be greater than the width of the first frame connection portion 153 of the upper elastic member 150, without being limited thereto.

In a further embodiment, when the width of the second frame connection portion 163-1 or 163-2 of the lower elastic member 160 is greater than the width of the connection portion 530a, 530b, 580a or 580b of the upper elastic member 150, the width of the connection portion 530a, 530b, 580a or 580b of the upper elastic member 150 may be equal to or smaller than the width of the first frame connection portion 153 of the upper elastic member 150.

For example, the first outer frame 152a of each of the upper elastic members 150-1 and 150-3 may have a left-right symmetric shape about a reference line 501 or 503. In addition, for example, the remaining portion of each of the fifth and sixth upper elastic members 150-5 and 150-6 excluding the third coupling portion 590 may be left-right symmetrical to the first outer frame 152b of each of the second and fourth upper elastic members 150-2 and 150-4 about a reference line 502 or 504, without being limited thereto.

The respective reference lines 501 to 504 may be a straight line that passes through the center point (101, see FIG. 12) and a corresponding one of the corners 144-1 to 144-4 (see FIG. 5) of the housing 140. Here, the center point 101 may be the center of the bobbin 110 or the center of the housing 140.

For example, in order to maintain balance of the housing 140 so as to inhibit the housing 140 from tilting to one side, the coupling regions S1 to S4, S5 and S6, and P1 and P2 of the first coupling portions 510, 560 and 570 of the upper elastic members 150 may be left-right symmetrical to one another about the respective reference lines 501 to 504, without being limited thereto.

For example, the first frame connection portions 153 of the first to fourth upper elastic members 150-1 to 150-4 may be rotation (e.g. 90 degrees rotation) symmetrical to one another about the center point 101 (see FIG. 12).

The first coupling regions S2, S3, S6 and P1 may be closer to the reference lines 501 to 504 than the second coupling regions S1, S4, S5 and P2. Here, among the coupling regions S1 to S6 and P1 and P2, the first coupling regions S2, S3, S6 and P1 may be connected to or adjacent to the connection portions 530a, 530b, 580a and 580b of the upper elastic members 150, and the second coupling regions S1, S4, S5 and P2 may be spaced apart from the connection portions 530a, 530b, 580a and 580b.

Figure 13:
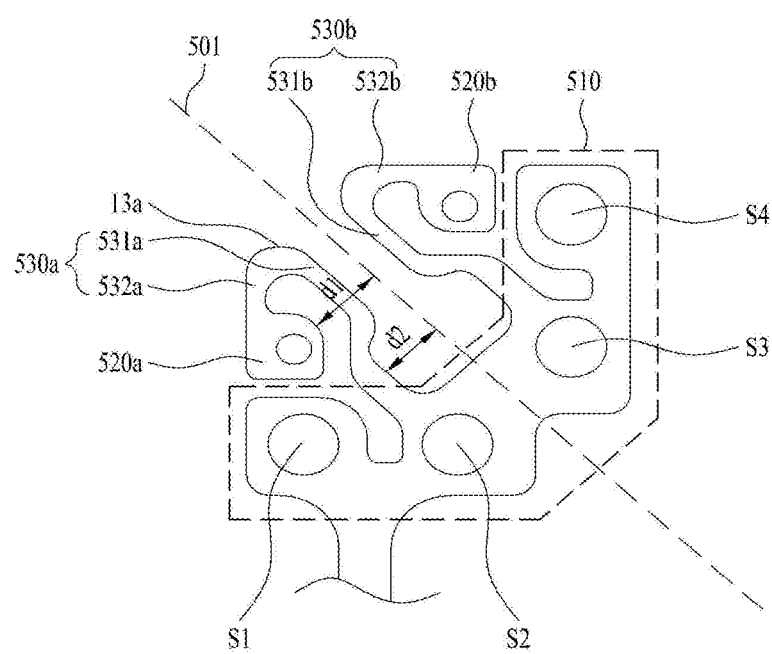
FIG. 13 is an enlarged view of a first outer frame illustrated in FIG. 12.

FIG. 13 is an enlarged view of the first outer frame 152a illustrated in FIG. 12.

Referring to FIG. 13, each of the connection portions 530a and 530b may include a first portion 531a or 531b, which extends in the direction parallel to the reference line 501 or 503, and a second portion 532a or 532b, which has one end connected to a distal end 13a of the first portion 531a or 531b and the other end connected to the second coupling portion 520a or 520b, the second portion 532a or 532b being bent at the distal end 13a of the first portion 531a or 531b. The shape of the connection portions 580a and 580b may be the same as the shape of the connection portions 530a and 530b. The first portions 531a and 531b of the connection portions 530a and 530b may have a line shape, such as a straight line shape, or a curved line shape having at least one bent portion.

For example, the first portions 531a and 531b of the connection portions 530a and 530b, connected to the first coupling portion 510, may extend from the center of the bobbin 110 toward the corner of the housing 140, and the second portions 532a and 532b of the connection portions 530a and 530b may be bent from the first portions 531a and 531b in the direction opposite to the reference line (e.g. 501).

An internal angle between the first portion 531a or 531b and the second portion 532a or 532b may be smaller than 90° but limited thereto.

Because the second portions 532a and 532b of the connection portions 530a and 530b are bent from the first portions 531a and 531b, the second portions 532a and 532b may distribute stress applied to the upper elastic member 150 and may inhibit the breakage of the connection portions 530a and 530b.

The distance d1 from the reference lines 501 to 504 to the second coupling portions 520a, 520b, 570a and 570b may be greater than the distance d2 from the reference lines 501 to 504 to the first portions 531a and 531b of the connection portions 530a, 530b, 580a and 580b (d1>d2). For example, d2 may be maximum distance from the reference lines 501 to 504 to the first portions 531a and 531b of the connection portions 530a, 530b, 580a and 580b.

The first connection portion 530a and the second connection portion 530b of each of the first and third upper elastic members 150-1 and 150-3 may be left-right symmetrical to each other about the reference line 501 or 503, without being limited thereto.

The connection portions 580a of the second and fourth upper elastic members 150-2 and 150-4 and the connection portions 580b of the fifth and sixth upper elastic members 150-5 and 150-6 may be left-right symmetrical to each other about the reference line 502 or 504, without being limited thereto.

Figure 14B:
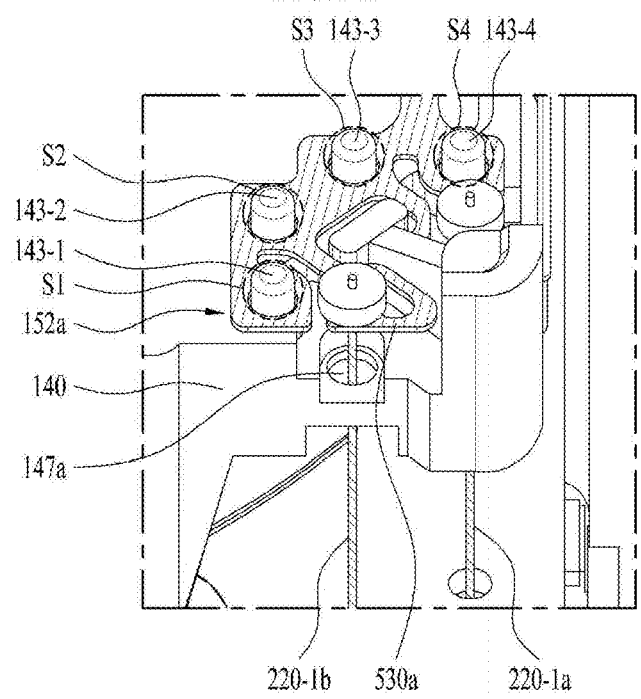
FIG. 14B is a second enlarged perspective view of the first portion illustrated by the dotted line in FIG. 8.

FIG. 14A is a first enlarged perspective view of a first portion 8a illustrated by a dotted line in FIG. 8, and FIG. 14B is a second enlarged perspective view of the first portion 8a illustrated by the dotted line in FIG. 8.

Referring to FIGS. 13, 14A and 14B, each of the first coupling portions 510 of the first and third upper elastic members 150-1 and 150-3 may include the coupling regions S1 to S4, which are coupled to the housing 140, and each of the connection portions 530a and 530b may be connected to any one coupling region S2 or S3 of the coupling regions S1 to S4.

The second coupling portions 520a and 520b of the first and third upper elastic members 150-1 and 150-3 may be spaced apart from the remaining coupling regions S1 and S4 excluding the coupling regions S2 and S3 connected to or adjacent to the connection portions 530a and 530b. The coupling regions S1 to S4 may be left-right symmetrical to one another about the reference line (e.g. 501).

The support members 220-1a and 220-1b may be spaced apart from the housing 140. For example, the support members 220-1a and 220-1b may pass through the first through-holes 147a and 147b formed in the second side portion 142 of the housing 140.

For example, the first upper support bosses 143-1 to 143-4 of the housing 140 may be coupled to the through-holes 157 of the first coupling portion 510, and the first upper support bosses 143-1 to 143-4 and the through-holes 157 coupled thereto may form the coupling regions S1 to S4.

The first coupling portion 510 may come into contact with the upper surface of the housing 140 and may be supported by the upper surface of the housing 140, whereas the connection portion 530a may not be supported by the upper surface of the housing 140, and the second coupling portion 520a and 520b may not come into contact with the housing 140 and may be spaced apart from the housing 140. In addition, the empty space between the connection portion 530a and the housing 140 may be filled with a damper (not illustrated).

The first coupling portion 510 of each of the first and third upper elastic members 150-1 and 150-3 may include the first to fourth coupling regions S1 to S4, and the second coupling portion 520 may include a second-first coupling portion 520a and a second-second coupling portion 520b, which are spaced from each other.

The connection portions 530a and 530b of each of the first and third upper elastic members 150-1 and 150-3 may include a first connection portion 530a, which connects the second coupling region S2 and the second-first coupling portion 520a to each other, and a second connection portion 530b, which connects the third coupling region S3 and the second-second coupling portion 520b to each other.

The support member 220-1a may be connected to the second-first coupling portion 520a, and the support member 220-1b may be connected to the second-second coupling portion 520b. Each of the support members 220-1a and 220-1b may be electrically be connected to corresponding one of the second-first coupling portion 520a and the second-second coupling portion 520b.

For example, the first and second coupling regions S1 and S2 may be located at the left side of the reference line (e.g. 501), and the third and fourth coupling regions S3 and S4 may be located at the right side of the reference line (e.g. 501).

The distance between each of the second and third coupling regions S2 and S3 and the reference line (e.g. 501) may be smaller than the distance between each of the first and fourth coupling regions S1 and S4 and the reference line (e.g. 501).

The first coupling portion 510 and the second-first coupling portion 520a may realize single contact owing to the first connection portion 530a, and the first coupling portion 510 and the second-second coupling portion 520b may realize single contact owing to the second connection portion 530b.

Figure 15A:
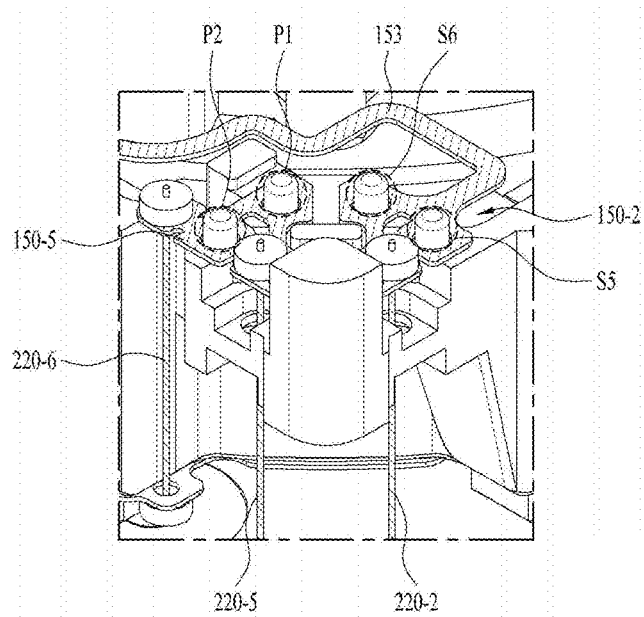
FIG. 15A is a first enlarged perspective view of a second portion illustrated by a dotted line in FIG. 8.
Figure 15B:
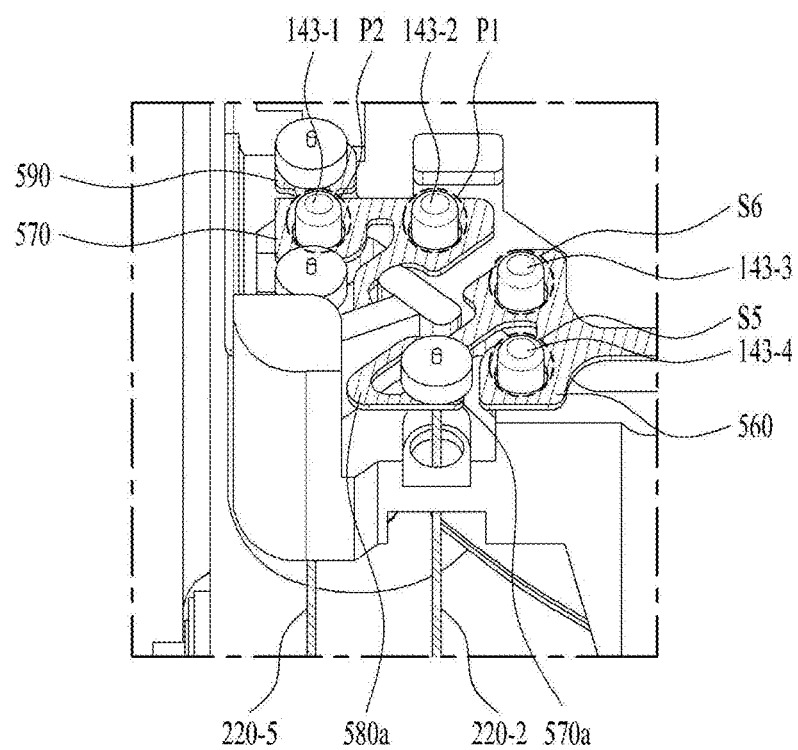
FIG. 15B is a second enlarged perspective view of the second portion illustrated by the dotted line in FIG. 8.

FIG. 15A is a first enlarged perspective view of a second portion 8b illustrated by a dotted line in FIG. 8, and FIG. 15B is a second enlarged perspective view of the second portion 8b illustrated by the dotted line in FIG. 8.

Referring to FIGS. 12, 15A and 15B, the first coupling portion 560 of each of the second and fourth upper elastic members 150-2 and 150-4 may include the coupling regions S5 and S6, which are coupled to the housing 140, and the connection portion 580a may be connected to any one coupling region S6 among the coupling regions S5 and S6.

The second coupling portion 570a of each of the second and fourth upper elastic members 150-2 and 150-4 may be spaced apart from the remaining coupling region S5 excluding the coupling region S6 connected to the connection portion 580a. The coupling regions S5 and S6 may be left-right symmetrical to the coupling regions P1 and P2 of the fifth and sixth upper elastic members 150-5 and 150-6 about the reference line (e.g. 502 or 504).

The first coupling portion 560 of each of the second and fourth upper elastic members 150-2 and 150-4 may come into contact with the upper surface of the housing 140 and may be supported by the upper surface of the housing 140, whereas the connection portion 580a may not be supported by the upper surface of the housing 140, and the second coupling portion 570a may not come into contact with the housing 140 and may be spaced apart from the housing 140. In addition, the empty space between the connection portion 580a and the housing 140 may be filled with a damper (not illustrated).

The distance between the sixth coupling region S6 and the reference line (e.g. 502) may be smaller than the distance between the fifth coupling region S5 and the reference line (e.g. 502).

The first coupling portion 560 and the second coupling portion 570a may realize single contact owing to the connection portion 580a.

Each of the fifth and sixth upper elastic members 150-5 and 150-6 may include the first coupling portion 570, which has the coupling regions P1 and P2 for the coupling of the housing 140, the second coupling portion 570b, which is coupled to any one of the support members, the connection portion 580b, which connects the first coupling portion 570 and the second coupling portion 570b to each other, and the third coupling portion 590, which is connected to the first coupling portion 570 and is coupled to the other one of the support members.

The first coupling portion 570 may come into contact with the upper surface of the housing 140 and may be supported by the upper surface of the housing 140, whereas the connection portion 580b may not be supported by the upper surface of the housing 140, and the second coupling portion 570b may not come into contact with the housing 140 and may be spaced apart from the housing 140.

The empty space between the connection portion 580b and the housing 140 may be filled with a damper (not illustrated).

The first coupling portion 560 of any one upper elastic member 150-2 or 150-4 among the first to fourth upper elastic members 150-1 to 150-4 and the first coupling portion 570 of a corresponding one of the fifth and sixth upper elastic members 150-5 and 150-6 may be spaced apart from each other, and may be left-right symmetrical to each other about the reference line (e.g. 502 or 504).

The first distance between the reference line 502 or 504 and the coupling region P1, which is connected to the connection portion 580b, among the coupling regions P1 and P2 of each of the fifth and sixth upper elastic members 150-5 and 150-6 may be smaller than the second distance between the reference line 502 or 504 and the remaining coupling region P2 excluding the coupling region P1 connected to the connection portion 580b.

In another embodiment, in the case where the electrical connection between the fifth and sixth upper elastic members 150-5 and 150-6 and the lower elastic member 160 is not necessary, the fifth and sixth upper elastic members 150-5 and 150-6 may be omitted. In addition, in the case where the fifth and sixth upper elastic members 150-5 and 150-6 are omitted, the second coupling portion 570a of the second upper elastic member 150-2 may be aligned with the reference line 504 so as to overlap the reference line 504, and the second coupling portion 570a of the fourth upper elastic member 150-4 may be aligned with the reference line 502 so as to overlap the reference line 502. This serves to limit the tilting and rotation of an Optical Image Stabilization (OIS) movable unit during hand tremor compensation.

The first and third upper elastic members 150-1 and 150-3 may have the same shape, and thus a description related to any one of both the upper elastic members 150-1 and 150-3 may be equally applied to the other one.

In addition, the second and fourth upper elastic members 150-2 and 150-4 may have the same shape, and thus a description related to any one of both the upper elastic members 150-2 and 150-4 may be equally applied to the other one.

In addition, the fifth and sixth upper elastic members 150-5 and 150-6 may have the same shape, and thus a description related to any one of both the upper elastic members 150-5 and 150-6 may be equally applied to the other one.

Although each of the upper and lower elastic members 150 and 160 of the embodiment is divided into two or more parts, in another embodiment, each of the upper and lower elastic members 150 and 160 may not be divided.

The second coupling boss 117 of the bobbin 110 may be coupled and fixed to a through-hole 161a formed in the second inner frame 161-1 or 161-2 of the lower elastic member 160 by thermal bonding or using an adhesive such as, for example, epoxy. The second lower support boss 145 of the housing 140 may be coupled and fixed to a through-hole 161b formed in the second outer frame 162-1 or 162-2 of the lower elastic member 160 by thermal bonding or using an adhesive such as, for example, epoxy.

Each of the upper elastic member 150 and the lower elastic member 160 may take the form of a leaf spring, without being limited thereto, and may take the form of a coil spring, for example.

In one example, the connection portions 530a, 530b, 580a and 580b of the upper elastic members 150 may be formed by support members, for example, springs (e.g. leaf springs). In another example, each of the connection portions 530a, 530b, 580a and 580b of the upper elastic members 150 may include a zigzag-shaped region, or at least one curved region or bent region.

In another embodiment, the role of electrical connection between the upper elastic members 150 and the role of electrical connection between the lower elastic members 160 may be exchanged.

The support members 220-1 to 220-6 according to the embodiment are spaced apart from the housing 140, and are directly connected to the second coupling portions 520a, 520b, 570a, and 570b and the connection portions 530a, 530b, 580a and 580b, rather than being fixed to the housing 140.

Because the connection portions 530a, 530b, 580a and 580b are not supported by the upper surface of the housing 140 and the second coupling portions 520a, 520b, 570a, and 570b are spaced apart from the housing 140, the second coupling portions 520a, 520b, 570a, and 570b and the connection portions 530a, 530b, 580a and 580b may easily move in the first direction. The support members 220-1 to 220-6 according to the embodiment are directly connected to the second coupling portions 520a, 520b, 570a, and 570b and the connection portions 530a, 530b, 580a and 580b, which are easily movable in the first direction, and therefore are more easily movable in the first direction than general support members, which are fixed to the housing 140. In this way, the support members 220-1 to 220-6 may improve the accuracy of hand tremor compensation. In particular, the support members 220-1 to 220-6 may distribute stress due to falling and shock, which may restrict the deformation of the support members 220-1 to 220-6 and inhibit electrical disconnection.

In addition, because the width W2 of the connection portions 530a, 530b, 580a and 580b is smaller than the width W1 of the frame connection portion 143, ease in the movement of the support members 220-1 to 220-6 in the first direction may be enhanced.

In addition, when the width of the second frame connection portions 163-1 and 163-2 of the lower elastic members 160 is greater than the width of the connection portions 530a, 530b, 580a and 580b of the upper elastic members 150, the connection portions 530a, 530b, 580a and 580b may easily move in the optical axis, or in the first direction, which is parallel to the optical axis, thereby distributing stress applied to the upper elastic members 150 and/or stress applied to the support members 220.

In addition, because the connection portions 530a, 530b, 580a and 580b are bent at least one time, the overall length of the connection portions 530a, 530b, 580a and 580b may be increased. In this way, the embodiment may distribute stress applied to the upper elastic members 150 and/or the support members 220, and may inhibit the connection portions 530a, 530b, 580a and 580b from being broken by stress, which is applied to the upper elastic members 150 and/or the support members 220 due to shock.

In addition, because the connection portions 530a, 530b, 580a and 580b realize single contact between the second coupling portion 520a, 520b, 570a, or 570b and the first coupling portion 510, 560, or 570, ease in the movement of the connection portions 530a, 530b, 580a and 580b in the first direction may further be enhanced, and the stress, which is applied to the upper elastic members 150 and/or the support members 220 due to shock, may be more efficiently distributed.

In addition, because the stress, which is applied to the upper elastic members 150 and/or the support members 220 due to shocks is distributed by the connection portions 530a, 530b, 580a and 580b, with regard to feedback control for hand tremor compensation, the frequency resonance characteristic of signals output from second position sensors 240a and 240b may restrict the generation of a high resonant frequency.

In another embodiment, a lens moving apparatus may include the bobbin 110 in which a lens is mounted, the housing 140, which accommodates the bobbin 110 therein, the magnet 130 and the second coil 230, which electromagnetically interact with each other so as to move the housing 140, an upper spring 150, which is mounted to both the bobbin 110 and the housing 140, a curvilinear shock-absorbing portion having one end connected to a portion of the upper spring 150, and a support member 220 (e.g. a suspension wire) connected to the other end of the damping member. The shock-absorbing portion may be bent at least one time. In addition, the lens moving apparatus according to the present embodiment may further include at least one of the constituent elements 120, 160, 170, 180, 240, 250, and 300 illustrated in FIG. 2.

Here, the shock-absorbing portion may include the connection portions 530a, 530b, 580a and 580b and the second coupling portions 520a, 520b, 570a and 570b. The descriptions of the connection portions 530a, 530b, 580a and 580b and the second coupling portions 520a, 520b, 570a and 570b may be applied to the shock-absorbing portion.

In addition, the upper spring 150 may include the first inner frame 151, the first outer frame having the first coupling portions 510, 560 and 570, and the frame connection portion 153.

The shock-absorbing portion may be located near a first connection region (e.g. the solder 901 in FIG. 14A) of the upper spring 150 and the support member 220. In addition, the shock-absorbing portion may be located between a second connection region (e.g. any one of the coupling regions S1 to S6 and P1 and P2) of the upper spring 150 and the housing 140 and the first connection region (e.g. the solder 901 in FIG. 14A).

For example, two shock-absorbing portions 520a, 530a 520b, and 530b may be formed on at least one corner of the upper spring 150. The upper spring 150 may be divided into a plurality of upper springs 150-1 to 150-8 and a plurality of shock-absorbing portions may be provided such that the shock-absorbing portions may be connected to the respective upper springs. A plurality of support members 220 (e.g. a plurality of suspension wires) may be provided such that the respective support members (e.g. the suspension wires) may be electrically connected to a corresponding one of the upper springs via the respective shock-absorbing portions.

Next, the base 210, the circuit board 250, and the second coil 230 will be described.

The base 210 may have a bore corresponding to the bore of the bobbin 110 and/or the bore of the housing 140, and may have a shape that coincides with or corresponds to that of the cover member 300, for example, a square shape.

Figure 10:
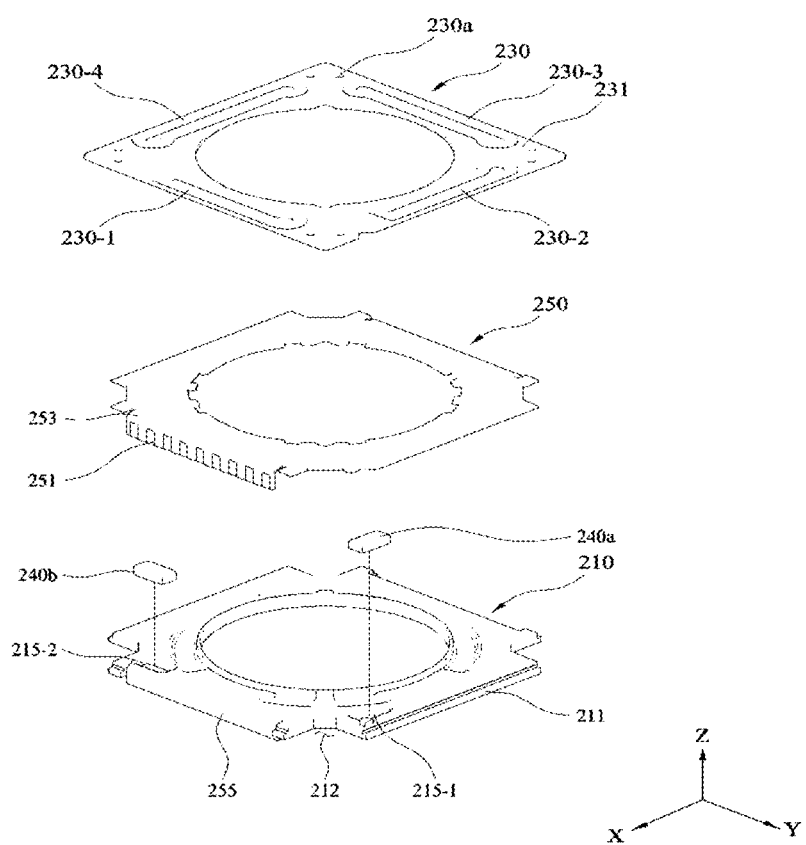
FIG. 10 is an exploded perspective view illustrating a base, second coil, second position sensor, and circuit board illustrated in FIG. 2.

FIG. 10 is an exploded perspective view of the base 210, the second coil 230, the second position sensor 240, and the circuit board 250 illustrated in FIG. 2.

Referring to FIG. 10, the base 210 may have a stepped portion 211, to which an adhesive may be applied when the cover member 300 is fixed to the base 210 using the adhesive. At this time, the stepped portion 211 may guide the cover member 300 coupled to the upper side thereof, and may come into contact with the end of the cover member 300.

The stepped portion 211 of the base 210 and the end of the cover member 300 may be attached or fixed to each other using, for example, an adhesive.

The base 210 may be provided with a support portion 255 on one side thereof facing a terminal 251 of the circuit board 250. The support portion 255 may support a terminal surface 253 of the circuit board 250, on which the terminal 251 is formed.

A second recess 212 may be formed in a region of the base 210 corresponding to each corner of the cover member 300. When the cover member 300 has a protrusion formed at each corner thereof, the protrusion of the cover member 300 may be fitted into the second recess 212 of the base 210.

In addition, second seating recesses 215-1 and 215-2 may be formed in the upper surface of the base 210 so that the second position sensor 240 may be disposed in each of the second seating recesses 215-1 and 215-2.

In the embodiment, two second seating recesses 215-1 and 215-2 may be provided, and two second position sensors 240a and 240b may be located respectively in a corresponding one of the two second seating recesses 215-1 and 215-2. A seating portion (not illustrated) for a filter 610 (see FIG. 16) may be formed in the lower surface of the base 210.

The support member 220 may be configured as an elastic support member such as, for example, a leaf spring, a coil spring, or a suspension wire. In another embodiment, the support member 220 may be integrally formed with the upper elastic member 150.

Meanwhile, the support members 220-1 to 220-8 may be disposed on the second side portions 142 of the housing 140. For example, one or more support members 220-1 to 220-8 may be disposed on each of the four second side portions 142. In another embodiment, the support members 220 may be leaf springs disposed on the first side portions 141 of the housing 140.

For example, the second coil 230 may be disposed above the circuit board 250, and the second position sensor 240 may be disposed below the circuit board 250.

The second position sensor 240 may sense displacement of an OIS movable unit in the direction perpendicular to the optical axis. Although the second position sensor 240 and the magnet 130 may be arranged on the same axis, without being limited thereto.

Here, the OIS movable unit may include an AF movable unit and constituent elements mounted to the housing 140. For example, the OIS movable unit may at least include the AF movable unit and the housing 140, and in some embodiments, the OIS movable unit may further include the magnets 130-1 to 130-4. For example, the AF movable unit may include the bobbin 110 and constituent elements, which are mounted to the bobbin 110 so as to move along with the bobbin 110. For example, the AF movable unit may at least include the bobbin 110 and a lens (not illustrated) mounted in the bobbin 110. In some embodiments, the AF movable unit may further include at least one of the first coil 120 and the first position sensor 170.

The circuit board 250 may be disposed on the upper surface of the base 210, and may have a bore corresponding to the bore of the bobbin 110, the bore of the housing 140 and/or the bore of the base 210. The outer circumferential surface of the circuit board 250 may have a shape that coincides with or corresponds to the upper surface of the base 210, for example, a square shape.

The circuit board 250 may include at least one terminal surface 253, which is bent from the upper surface and is provided with a plurality of terminals or pins, which receive electrical signals from the outside.

In FIG. 10, the second coil 230 is implemented as being provided on the circuit member 231, which is separate from the circuit board 250, without being limited thereto. In another embodiment, the second coil 230 may take the form of a ring-shaped coil block, an FP coil, or a circuit pattern formed on the circuit board 250.

The second coil 230 may have through-holes 230a formed in the circuit member 231, and the support members 220-1 to 220-4, 220-5 and 220-7 may penetrate the through-holes 230a so as to be electrically connected to the circuit board 250. For example, the support members 220-1 to 220-4, 220-5 and 220-7 may be electrically connected to the circuit board 250 via thermal bonding such as, for example, soldering.

The second coil 230 is located above the circuit board 250 so as to be opposite to the magnet 130 fixed to the housing 140.

Although four second coils 230 may be installed on four sides of the circuit member 231, the embodiment is not limited thereto, and only two second coils may be installed respectively in the second direction and the third direction, or four or more second coils may be installed.

The housing 140 may move in the second direction and/or the third direction, for example, in the X-axis and/or the Y-axis via interaction of the magnet 130 and the second coil 230 arranged to be opposite to each other as described above, thereby performing hand tremor compensation.

The second position sensor 240 may be a Hall sensor, and any other sensors may be used so long as they can sense the strength of a magnetic field. For example, the second position sensor 240 may take the form of a driver including a Hall sensor, or may be configured as a position detection sensor alone such as, for example, a Hall sensor.

At least one terminal 251 may be installed on the terminal surface 253 of the circuit board 250. The circuit board 250 may receive external power through a plurality of terminals 251 installed on the terminal surface 253 and may supply the power to the first and second coils 120 and 230 and the first and second position sensors 170 and 240, and may outwardly output signals received from the first and second position sensors 170 and 240.

In some embodiments, the circuit board 250 may be a Flexible Printed Circuit Board (FPCB), without being limited thereto, and the terminals 251 of the circuit board 250 may be directly formed on the surface of the base 210 via, for example, a surface electrode method.

Meanwhile, the lens moving apparatus according to the above-described embodiment may be used in various fields such as, for example, a camera module. The camera module may be applied to, for example, a mobile appliance such as a cellular phone or the like.

Figure 16:
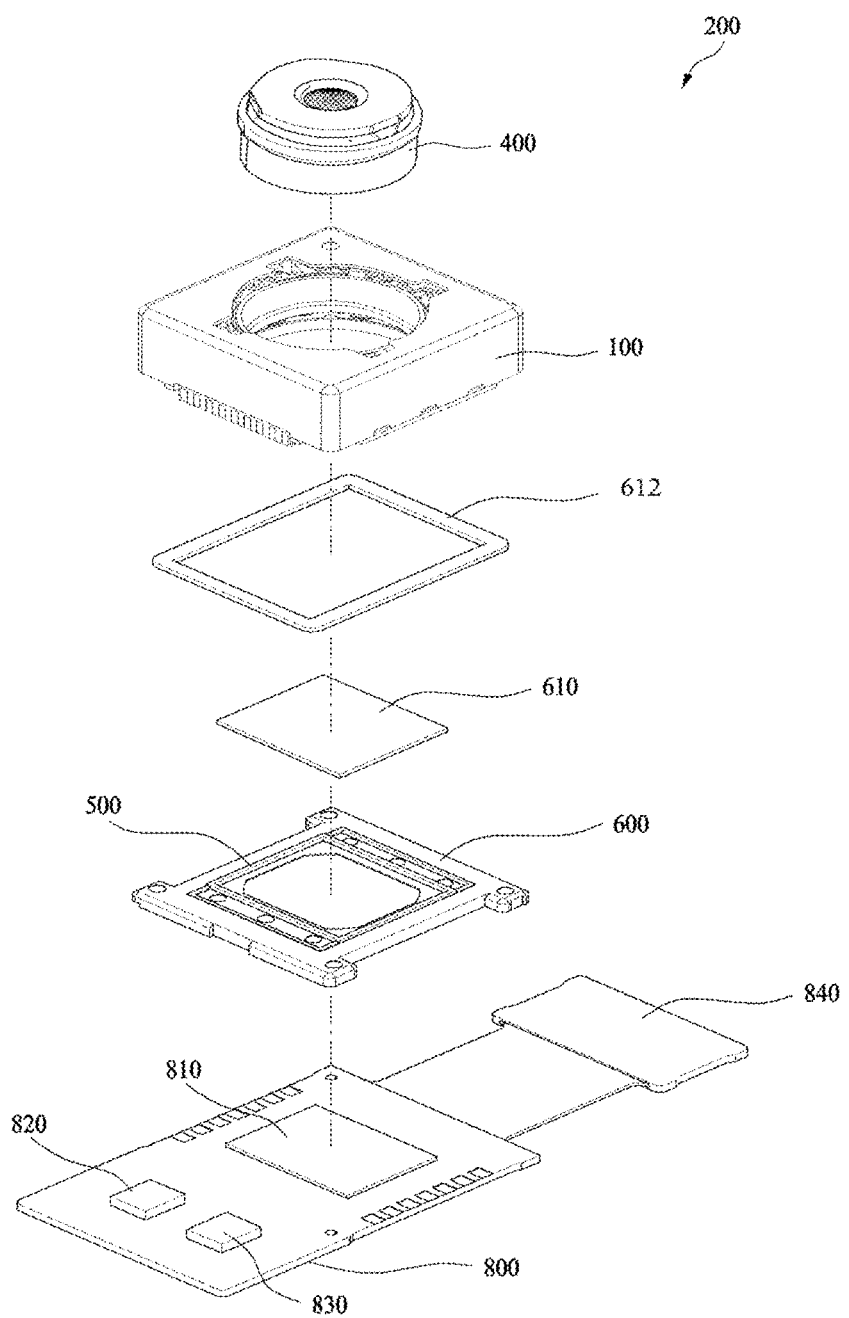
FIG. 16 is an exploded perspective view illustrating a camera module according to an embodiment.

FIG. 16 is an exploded perspective view illustrating a camera module 200 according to an embodiment.

Referring to FIG. 16, the camera module may include a lens barrel 400, the lens moving apparatus 100, an adhesive member 612, a filter 610, a first holder 600, a second holder 800, an image sensor 810, a motion sensor 820, a hand tremor controller 830, and a connector 840.

The lens barrel 400 may be mounted in the bobbin 110 of the lens moving apparatus 100.

The first holder 600 may be located under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. In addition to the attachment function described above, the adhesive member 612 may serve to inhibit impurities from entering the lens moving apparatus 100.

For example, the adhesive member 612 may be, for example, epoxy, thermosetting adhesive, or ultraviolet curing adhesive.

The filter 610 may serve to inhibit light within a specific frequency band having passed through the lens barrel 400 from being introduced into the image sensor 810. The filter 610 may be an infrared-light blocking filter, without being limited thereto. At this time, the filter 610 may be oriented parallel to the X-Y plane.

A region of the first holder 600 in which the filter 610 is mounted may be provided with a bore in order to allow the light having passed through the filter 610 to be introduced into the image sensor 810.

The second holder 800 may be disposed under the first holder 600, and the image sensor 810 may be mounted on the second holder 600. The light having passed through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external appliance.

The second holder 800 may take the form of a circuit board on which the image sensor 810 may be mounted, a circuit pattern may be formed, and various devices may be coupled.

The image sensor 810 may receive an image included in light introduced through the lens moving apparatus 100, and may convert the received image into electrical signals.

The filter 610 and the image sensor 810 may be spaced apart from each other so as to be opposite to each other in the first direction.

The motion sensor 820 may be mounted on the second holder 800, and may be electrically connected to the hand tremor controller 830 through the circuit pattern formed on the second holder 800.

The motion sensor 820 outputs rotational angular speed information regarding the movement of the camera module 200. The motion sensor 820 may take the form of a dual-axis or triple-axis gyro sensor, or an angular speed sensor.

The hand tremor controller 830 may be mounted on the second holder 800, and may be electrically connected to the second position sensor 240 and the second coil 230 of the lens moving apparatus 100. For example, the second holder 800 may be electrically connected to the circuit board 250 of the lens moving apparatus 100, and the hand tremor controller 820 mounted on the second holder 800 may be electrically connected to the second position sensor 240 and the second coil 230 through the circuit board 250.

The hand tremor controller 830 may output a drive signal, which is required to allow the OIS movable unit of the lens moving apparatus 100 to perform hand tremor compensation, based on signals output from the second position sensor 240 of the lens moving apparatus 100.

The connector 840 may be electrically connected to the second holder 800, and may have a port for the electrical connection of an external appliance.

In addition, the lens moving apparatus 100 according to the embodiment may be included in an optical instrument, which forms an image of an object present in a space using reflection, refraction, absorption, interference, and diffraction of light, which increases visibility, which records and reproduces an image via a lens, or which performs optical measurement or propagation or transmission of images. For example, the optical instrument according to the embodiment may include a smart phone or a portable terminal equipped with a camera.

Figure 17:
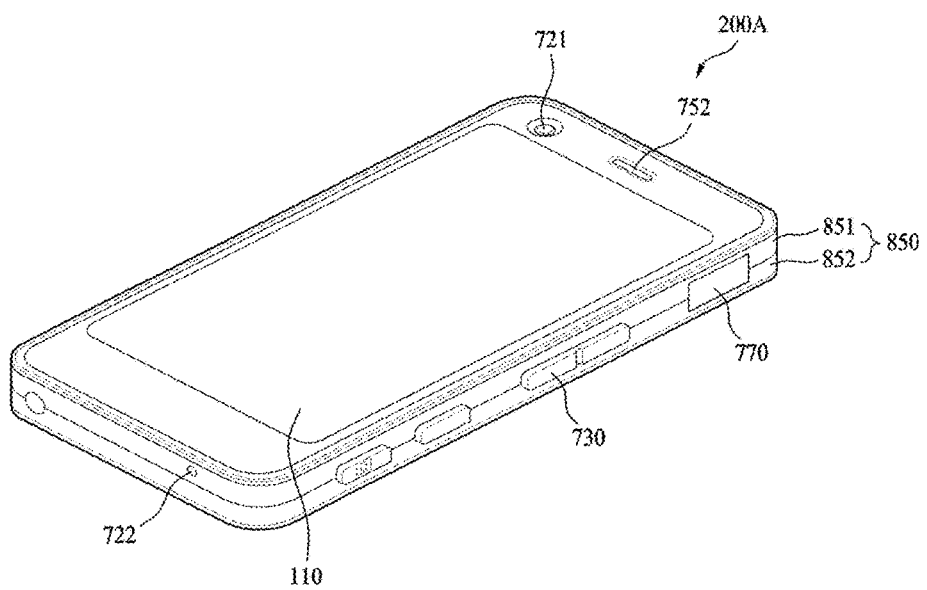
FIG. 17 is a perspective view illustrating a portable terminal including a camera module according to an embodiment.
Figure 18:
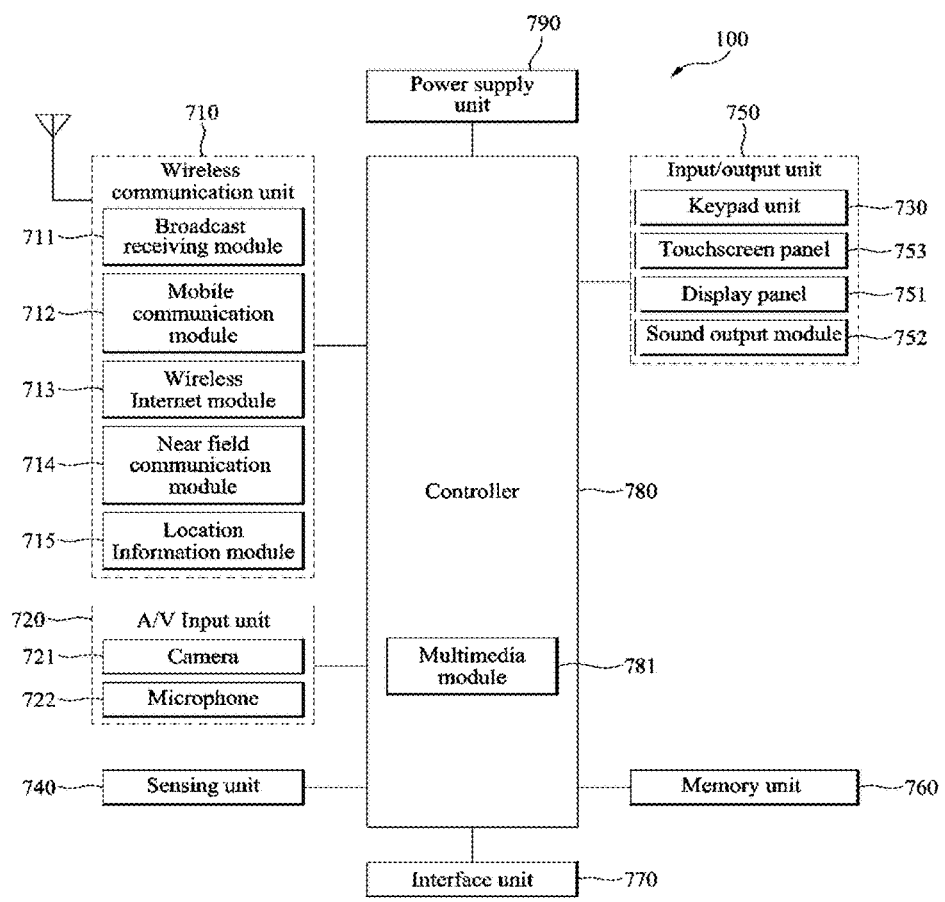
FIG. 18 is a view illustrating the configuration of the portable terminal illustrated in FIG. 17.

FIG. 17 is a perspective view illustrating a portable terminal 200A including a camera module according to an embodiment, and FIG. 18 is a view illustrating the configuration of the portable terminal 200A illustrated in FIG. 17.

Referring to FIGS. 17 and 18, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 17 has a bar shape, without being limited thereto, and may be any of various types such as, for example, a slide type, a folder type, a swing type, or a swivel type in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast receiving module 711, a mobile communication module 712, a wireless Internet module 713, a near field communication module 714, and a location information module 715.

The A/V input unit 720 serves to input audio signals or video signals, and may include, for example, a camera 721 and a microphone 722.

The camera 721 may be the camera module 200 according to the embodiment illustrated in FIG. 16.

The sensing unit 740 may sense the current state of the terminal 200A such as, for example, the opening or closing of the terminal 200A, the location of the terminal 200A, the presence of user touch, the orientation of the terminal 200A, or the acceleration/deceleration of the terminal 200A, and may generate a sensing signal to control the operation of the terminal 200A. For example, when the terminal 200A is a slide type phone, the sensing unit 740 may sense whether the slide type phone is opened or closed. In addition, the sensing unit 740 serves to sense, for example, whether power is supplied from the power supply unit 790, or whether the interface unit 770 is coupled to an external appliance.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. For example, the display module 751 may include at least one of a liquid crystal display, thin film transistor liquid crystal display, organic light emitting diode display, flexible display and 3D display.

The sound output module 752 may output audio data received from the wireless communication unit 710 in, for example, a call signal receiving mode, a call mode, a recording mode, a voice recognition mode, or a broadcast receiving mode, or may output audio data stored in the memory unit 760.

The touchscreen panel 753 may convert variation in capacitance, caused by a user touch to a specific touchscreen region, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external appliance. The interface unit 770 may receive power or data from the external appliance and transmit the same to respective constituent elements inside the terminal 200A, or may transmit data inside the terminal 200A to the external appliance. For example, the interface unit 770 may include, for example, a wired/wireless headset port, external charger port, wired/wireless data port, memory card port, port for connection of a device having an identification module, an audio input/output (I/O) port, a video I/O port, and an earphone port.

The controller 780 may control the general operation of the terminal 200A. For example, the controller 780 may perform control and processing related to, for example, voice call, data communication, and video call.

The controller 780 may include a multimedia module 781 for multimedia playback. The multimedia module 781 may be provided inside the controller 780, or may be provided separately from the controller 780.

The controller 780 may perform pattern recognition processing by which writing input or drawing input to a touchscreen is perceivable as characters and images respectively.

The power supply unit 790 may supply power required to operate the respective constituent elements upon receiving external power or internal power under the control of the controller 780.

As is apparent from the above description, the embodiments have the effects of distributing stress which is applied to an upper elastic member of a lens moving apparatus due to shock and of improving accuracy for hand tremor compensation.

The features, configurations, effects and the like described above in the embodiments are included in at least one embodiment, and are not necessary to be limited to only one embodiment. In addition, the features, configuration, effects and the like exemplified in the respective embodiments may be combined with other embodiments or modified by those skilled in the art. Accordingly, content related to these combinations and modifications should be construed as within the scope of the embodiments.

What is claimed is:

1. A lens moving apparatus comprising:
    a housing comprising a first corner portion and a second corner portion disposed opposite to the first corner portion;
    a bobbin disposed in the housing;
    a first position sensor disposed between the housing and the bobbin;
    a first coil disposed on the bobbin;
    a circuit board electrically comprising six terminals;
    an upper elastic member coupled to an upper portion of the housing and comprising six upper elastic members; and
    a supporting member comprising six wires connected to the six upper elastic members, respectively;
    wherein at least a part of two of the six upper elastic members are disposed on the first corner portion, and at least a part of another two of the six upper elastic members are disposed on the second corner portion,
    wherein one of the two of the six upper elastic members is coupled to the housing and the supporting member, and comprises a first connection portion having a curved part, and the first connection portion is coupled with the supporting member,
    wherein the one of the two of the six upper elastic members is electrically connected to the first coil,
    wherein one of the another two of the six upper elastic members is electrically connected to the first position sensor,
    wherein the first coil is electrically connected to two of the six terminals and the first position sensor is electrically connected to another four of the six terminals via the upper elastic member, and
    wherein the two of the six upper elastic members are separated from each other.

2. The lens moving apparatus according to claim 1, wherein the one of the another two of the six upper elastic members is coupled to the housing and the supporting member, and comprises a second connection portion having a curved part, and the second connection portion is coupled with the supporting member.

3. The lens moving apparatus according to claim 2, wherein the another two of the six upper elastic members are separated from each other.

4. The lens moving apparatus according to claim 1, wherein the one of the two of the six upper elastic members comprises a first coupling portion coupled to the housing, a second coupling portion coupled to the supporting member, and
    wherein the first connection portion connects the first coupling portion and the second coupling portion.

5. The lens moving apparatus according to claim 2, wherein the one of the another two of the six upper elastic members comprises a first coupling portion coupled to the housing, a second coupling portion coupled to the supporting member, and
    wherein the second connection portion connects the first coupling portion and the second coupling portion.

6. The lens moving apparatus according to claim 1, comprising a damper disposed between the upper elastic member and the housing.

7. The lens moving apparatus according to claim 1, wherein the six wires are first to sixth wires, and
    wherein the first and second wires are disposed on the first corner portion, and the first and second wires are connected to the two of the six upper elastic members, respectively.

8. The lens moving apparatus according to claim 7, wherein the third and fourth wires are disposed on the second corner portion, and the third and fourth wires are connected to the another two of the six upper elastic members, respectively.

9. The lens moving apparatus according to claim 8, wherein the fifth wire is disposed on a third corner portion of the housing, and the fifth wire is connected to one of a remaining two of the six upper elastic members, and
    wherein the sixth wire is disposed on a fourth corner portion of the housing disposed opposite to the third corner portion, and the sixth wire is connected to another one of the remaining two of the six upper elastic members.

10. The lens moving apparatus according to claim 1, comprising:
    a magnet disposed on the housing and facing the first coil;
    a sensing magnet;
    a lower elastic member coupled to a lower portion of the housing;
    a second position sensor disposed on the circuit board; and a base disposed under the circuit board;
wherein the circuit board comprises a second coil facing the magnet.

11. The lens moving apparatus according to claim 10, wherein the magnet comprises first and second magnets facing each other, and third and fourth magnets facing each other, and
   wherein the second coil comprises a first coil portion disposed opposite to the first and second magnets and a second coil portion disposed opposite to the third and fourth magnets.

12. The lens moving apparatus according to claim 11, wherein the second position sensor comprises a first sensor and a second sensor, and
   wherein the first sensor is arranged with one of the first and second magnets, and the second sensor is arranged with one of the third and fourth magnets.

13. The lens moving apparatus according to claim 10, wherein the sensing magnet is disposed on the bobbin,
   wherein the first position sensor is configured to sense the sensing magnet, and
   wherein the second position sensor is configured to sense the magnet.

14. The lens moving apparatus according to claim 1, wherein the one of the two of the six upper elastic members comprises an inner frame coupled to the bobbin, an outer frame coupled to the housing, and a frame connection portion connecting the inner frame and the outer frame, and
   wherein the frame connection portion has a width that is smaller width than a width of the first connection portion.

15. A lens moving apparatus comprising:
a housing comprising a first corner portion and a second corner portion disposed opposite to the first corner portion;
a bobbin disposed in the housing;
a first position sensor disposed between the housing and the bobbin;
a first coil disposed on the bobbin;
a magnet disposed on the housing and facing the first coil;
a second coil disposed under the magnet;
a circuit board electrically comprising four terminals;
an upper elastic member coupled to an upper portion of the housing and comprising four upper elastic members separated from each other; and
a supporting member comprising four wires connected to the four upper elastic members respectively;
wherein two of the four upper elastic members are disposed on the first corner portion, and the other two of the four upper elastic members are disposed on the second corner portion,
wherein each of the two of the four upper elastic members is coupled to the housing and the supporting member, and comprises a connection portion having a curved part, and the connection portion is coupled with the supporting member,
wherein the first coil is electrically connected to two of the four terminals and the first position sensor is electrically connected to the other two of the four terminals via the upper elastic member.

16. The lens moving apparatus according to claim 15, wherein the four wires are first to fourth wires,
wherein the four terminals are first to fourth terminals,
wherein the supporting member comprises a fifth wire and a sixth wire, and the first position sensor is electrically connected to two of the four wires and to the fifth and sixth wires,
wherein the circuit board comprises a fifth terminal and a sixth terminal, and the first coil is electrically connected to two of the six terminals via the other two of the four wires,
wherein the upper elastic member comprises a fifth upper elastic member and a sixth upper elastic member separated from each other, and
wherein the first coil is electrically connected to the circuit board via two of the six upper elastic members and the first position sensor is electrically connected to the circuit board via four others of the six upper elastic members.

17. A lens moving apparatus comprising:
a housing comprising a first corner portion and a second corner portion disposed opposite to the first corner portion;
a bobbin disposed in the housing;
a first position sensor disposed between the housing and the bobbin;
a first coil disposed on the bobbin;
a magnet disposed on the housing and facing the first coil;
a second coil disposed under the magnet;
a circuit board electrically comprising four terminals;
an upper elastic member coupled to an upper portion of the housing and comprising four upper elastic members separated from each other; and
a supporting member comprising four wires connected to the four upper elastic members, respectively;
wherein two of the four upper elastic members are disposed on the first corner portion, and the other two of the four upper elastic members are disposed on the second corner portion,
wherein each of the two of the four upper elastic members comprises a first coupling portion coupled to the housing, a second coupling portion coupled to the supporting member, and a first connection portion having a curved part connecting the first coupling portion and the second coupling portion,
wherein the first coil is electrically connected to two of the four terminals and the first position sensor is electrically connected to the other two of the four terminals via the upper elastic member.

18. The lens moving apparatus according to claim 17, wherein at least one of the two of the four upper elastic members extends along a side of the housing.

19. The lens moving apparatus according to claim 17, wherein at least one of the two of the four upper elastic members extends toward a third corner portion of the housing.

20. The lens moving apparatus according to claim 17, wherein the four wires are first to fourth wires, and
wherein the supporting member comprises a fifth wire and a sixth wire, and the first position sensor is electrically connected to four of the six wires.

21. The lens moving apparatus according to claim 20, wherein the four terminals are first to fourth terminals, and
wherein the circuit board comprises a fifth terminal and a sixth terminal, and the first coil is electrically connected to two of the six terminals via another two of the six wires.

* * * * *